United States Patent
Jeon

(10) Patent No.: US 11,256,681 B2
(45) Date of Patent: Feb. 22, 2022

(54) METHOD AND APPARATUS FOR CONTROLLING ACCESS TO TRIE DATA STRUCTURE

(71) Applicant: WunBae Jeon, Yongin-si (KR)

(72) Inventor: WunBae Jeon, Yongin-si (KR)

( * ) Notice: Subject to any disclaimer, the term of this patent is extended or adjusted under 35 U.S.C. 154(b) by 0 days.

(21) Appl. No.: 17/186,205

(22) Filed: Feb. 26, 2021

(65) Prior Publication Data
US 2021/0279225 A1   Sep. 9, 2021

(30) Foreign Application Priority Data
Mar. 3, 2020   (KR) .................. 10-2020-0026565

(51) Int. Cl.
*G06F 16/23* (2019.01)
*G06F 16/22* (2019.01)

(52) U.S. Cl.
CPC ...... *G06F 16/2343* (2019.01); *G06F 16/2246* (2019.01)

(58) Field of Classification Search
CPC ............ G06F 16/2246; G06F 16/2343; G06F 16/2455; G06F 16/24562; G06F 16/901; G06F 16/9024; G06F 16/9027; G06F 9/524; G06F 9/526
See application file for complete search history.

(56) References Cited

U.S. PATENT DOCUMENTS

| | | | |
|---|---|---|---|
| 5,495,609 A | 2/1996 | Scott | |
| 6,484,172 B1 * | 11/2002 | Lee | .................. G06F 16/2343 |
| 7,181,452 B1 | 2/2007 | Luo et al. | |
| 8,176,023 B2 | 5/2012 | Graefe | |
| 8,666,981 B2 | 3/2014 | Liedes | |
| 9,454,560 B2 | 9/2016 | Cha et al. | |
| 10,691,676 B1 | 6/2020 | Zhang | |
| 2005/0171960 A1 * | 8/2005 | Lomet | ................. G06F 16/2246 |
| 2011/0320496 A1 | 12/2011 | Reid et al. | |
| 2013/0185271 A1 * | 7/2013 | Strain | ................. G06F 16/2246 707/704 |

(Continued)

FOREIGN PATENT DOCUMENTS

KR   101089424 B1   12/2011
KR   20120045756 A   5/2012

(Continued)

OTHER PUBLICATIONS

Cha, S.K., "Cache-conscious concurrency control of main-memory indexes on shared-memory multiprocessor systems", In VLDB, vol. 1, 2001, pp. 181-190.

(Continued)

*Primary Examiner* — James E Richardson
(74) *Attorney, Agent, or Firm* — Dorsey & Whitney LLP

(57) ABSTRACT

A technology for controlling an access of a trie by managing node access permissions of processes that access a trie data structure and perform an operation is disclosed. Example embodiments include accessing a window initiating node in a trie, determining whether a next node is an anchor node while visiting lower nodes of the window initiating node in a predetermined traversal order, locking the next node when the next node is an anchor node, releasing a lock of the window initiating node when the window initiating node is an anchor node, and setting the next node as the window initiating node.

15 Claims, 21 Drawing Sheets

(56) References Cited

U.S. PATENT DOCUMENTS

| | | |
|---|---|---|
| 2013/0226885 A1 | 8/2013 | Ottaviano |
| 2014/0310317 A1* | 10/2014 | Spillane .............. G06F 16/9027 |
| | | 707/803 |
| 2016/0103858 A1 | 4/2016 | Katz et al. |
| 2016/0335299 A1* | 11/2016 | Vemulapati ......... G06F 16/2246 |
| 2017/0344590 A1 | 11/2017 | Aron et al. |
| 2018/0075074 A1* | 3/2018 | Shimizu .............. G06F 16/2246 |

FOREIGN PATENT DOCUMENTS

| | | | |
|---|---|---|---|
| WO | 2019000388 A1 | 1/2019 | |
| WO | WO-2019098871 A * | 5/2019 | ......... G06F 16/2246 |

OTHER PUBLICATIONS

KIPO, "Grant of Patent—Notice of Allowance", KR App. No. 10-2020-0026565, dated Nov. 2, 2020, 4 pages.

KIPO, "Notification of Reason for Refusal—Office Action", KR App. No. 10-2020-0026565, dated Oct. 5, 2020, 6 pages.

Leis, V. et al., "The ART of Practical Synchronization", DaMoN'16, Proceedings of the 12th International Workshop on Data Management on New Hardware, Jun. 2016, pp. 1-8.

Lindstrom, Jan et al., "IBM solidDB: In-Memory Database Optimized for Extreme Speed and Availability", IEEE Data Eng. Bull. 36, No. 2, 2013, pp. 14-20.

\* cited by examiner

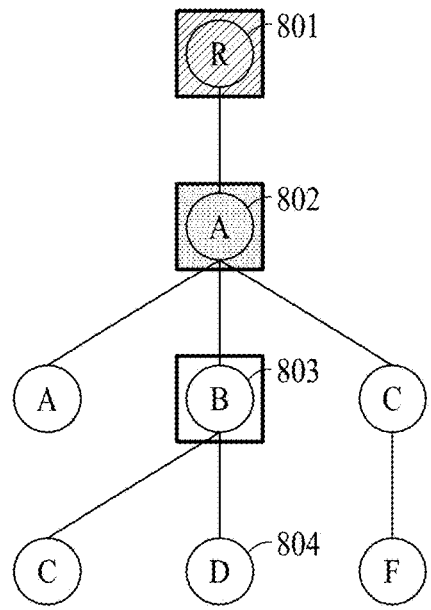

| Process1 | Process2 |
|---|---|
| Determining whether node AB is anchor node (anchor node O) | Requesting a lock and waiting for return on a root node |
| Setting lock on node AB, and releasing lock of node A | |
| | Setting lock on node A, and releasing lock on root node |
| Deleting node ABD | |
| Releasing lock of node AB | |
| | Determining whether node AB is anchor node (anchor node X) |
| | Failing to search for node ABD |

FIG. 8

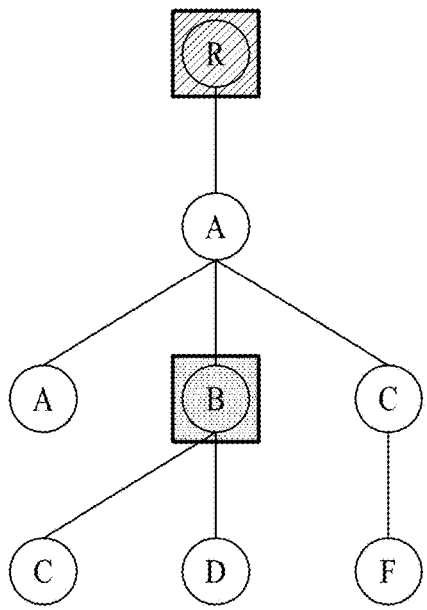

| Process1 | Process2 |
|---|---|
| Determining whether node AB is anchor node (anchor node O) | Requesting a lock and waiting for return on a root node |
| Setting lock on node AB, and releasing lock of node A | |
| | Setting lock on node A, and releasing lock on root node |
| Deleting node ABD | |
| Releasing lock of node AB | |
| | Determining whether node AB is anchor node (anchor node X) |
| | Failing to search for node ABD |

FIG. 9

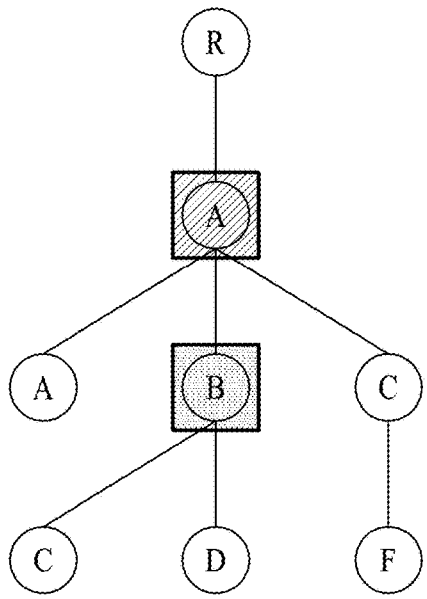

| Process1 | Process2 |
|---|---|
| Determining whether node AB is anchor node (anchor node O) | Requesting a lock and waiting for return on a root node |
| Setting lock on node AB, and releasing lock of node A | |
| | Setting lock on node A, and releasing lock on root node |
| Deleting node ABD | |
| Releasing lock of node AB | |
| | Determining whether node AB is anchor node (anchor node X) |
| | Failing to search for node ABD |

FIG. 10

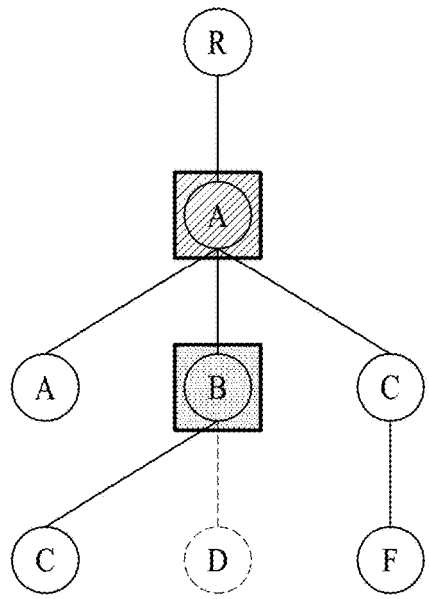

| Process1 | Process2 |
|---|---|
| Determining whether node AB is anchor node (anchor node O) | Requesting a lock and waiting for return on a root node |
| Setting lock on node AB, and releasing lock of node A | |
| | Setting lock on node A, and releasing lock on root node |
| Deleting node ABD | |
| Releasing lock of node AB | |
| | Determining whether node AB is anchor node (anchor node X) |
| | Failing to search for node ABD |

FIG. 11

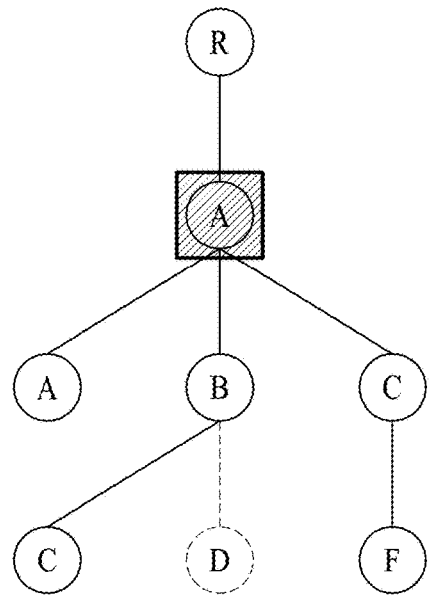

| Process1 | Process2 |
|---|---|
| Determining whether node AB is anchor node (anchor node O) | Requesting a lock and waiting for return on a root node |
| Setting lock on node AB, and releasing lock of node A | |
| | Setting lock on node A, and releasing lock on root node |
| Deleting node ABD | |
| Releasing lock of node AB | |
| | Determining whether node AB is anchor node (anchor node X) |
| | Failing to search for node ABD |

FIG. 12

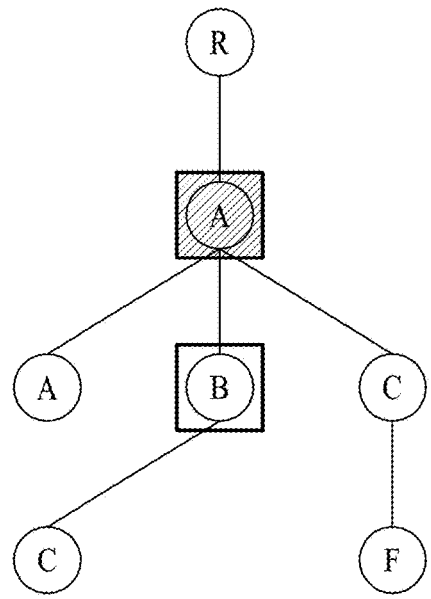

| Process1 | Process2 |
|---|---|
| Determining whether node AB is anchor node (anchor node O) | Requesting a lock and waiting for return on a root node |
| Setting lock on node AB, and releasing lock of node A | |
| | Setting lock on node A, and releasing lock on root node |
| Deleting node ABD | |
| Releasing lock of node AB | |
| | Determining whether node AB is anchor node (anchor node X) |
| | Failing to search for node ABD |

FIG. 13

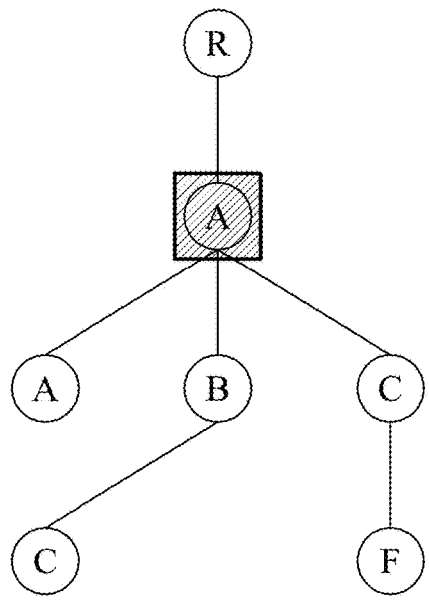

| Process1 | Process2 |
|---|---|
| Determining whether node AB is anchor node (anchor node O) | Requesting a lock and waiting for return on a root node |
| Setting lock on node AB, and releasing lock of node A | |
| | Setting lock on node A, and releasing lock on root node |
| Deleting node ABD | |
| Releasing lock of node AB | |
| | Determining whether node AB is anchor node (anchor node X) |
| | Failing to search for node ABD |

FIG. 14

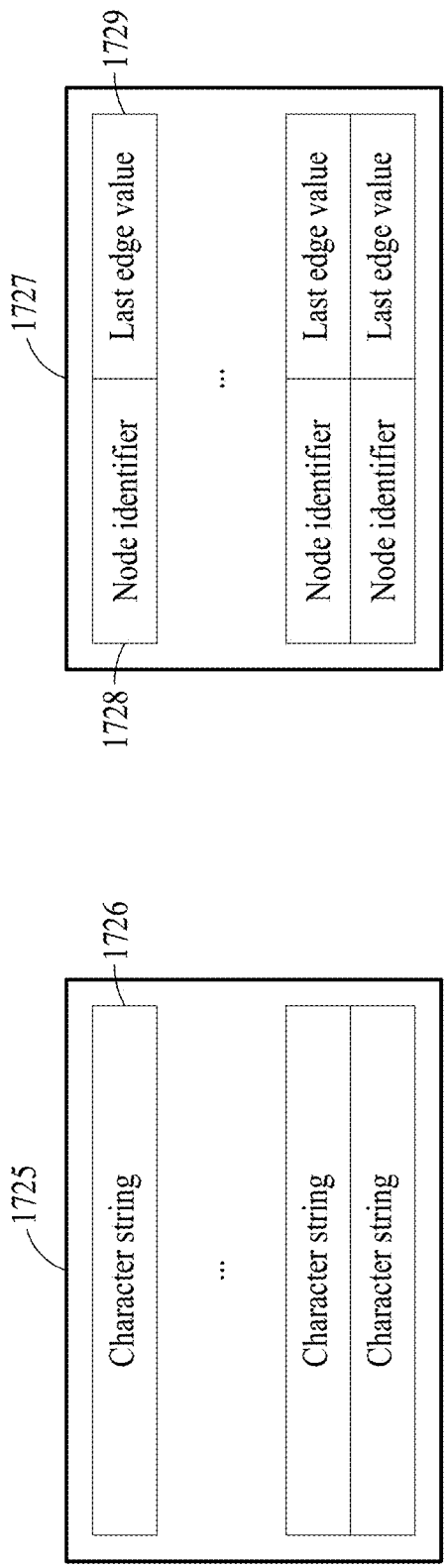
FIG. 17D
FIG. 17E
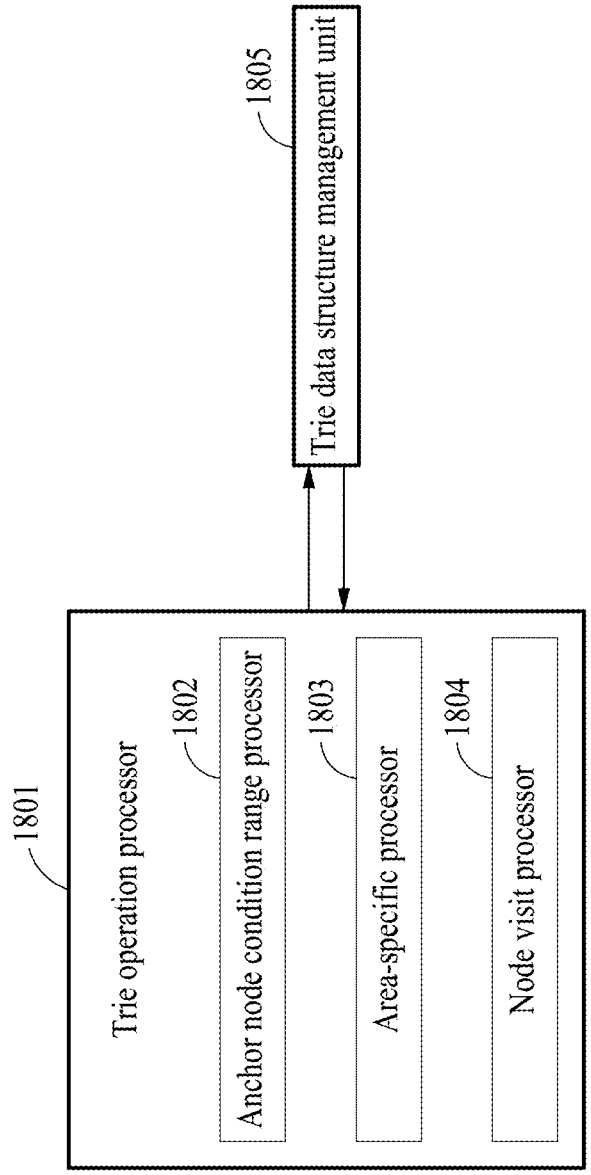
FIG. 18

| | | | | | | | |
|---|---|---|---|---|---|---|---|
| (R area)? | | | | | | lower edge scan(lower/upper boundary) | edge marking |
| (L area)? | !(last level)? | lock request | access | | (anchor)? | upper lock release | lower edge scan (lower boundary) | edge marking |
| | | | | | !(anchor)? | | lower edge scan (lower boundary) | lock release |
| | (last level)? | lock request | access | (lower boundary equal sign)? node operation | (anchor)? | upper lock release | lower edge scan (full) | edge marking |
| | | | | | !(anchor)? | | lower edge scan (full) | lock release | (iteration completion)?; upper lock release + next iteration setting |
| (N area)? | | lock request | access | node operation | (anchor)? | upper lock release | lower edge scan (full) | edge marking |
| | | | | | !(anchor)? | | lower edge scan (full) | lock release | (iteration completion)?; upper lock release + next iteration setting |
| (U area)? | !(last level)? | lock request | access | node operation | (anchor)? | upper lock release | lower edge scan (upper boundary) | edge marking |
| | | | | | !(anchor)? | | lower edge scan (upper boundary) | lock release |
| | (last level)? | lock request | access | (upper boundary equal sign)? node operation | | | | lock release | upper lock release |
| (C area)? | (C-c type)? | | | | | | | | upper lock release |
| | | !(lower/upper boundary equal sign)? | | | | | | | upper lock release |
| | (C-a type)? | !(lower/upper boundary equal sign)? | !(last level)? | lock request | access | | (anchor)? | upper lock release | lower edge scan(lower/upper boundary) |
| | | | | | | | !(anchor)? | | lower edge scan(lower/upper boundary) | lock release |
| | | | (last level)? | lock request | access | node operation | | | lower edge scan(lower/upper boundary) | lock release | upper lock release |
| | (C-b type)? | | !(last level)? | lock request | access | | (anchor)? | upper lock release | lower edge scan(lower/upper boundary) |
| | | | | | | | !(anchor)? | | lower edge scan (upper boundary) | lock release |
| | | | (last level)? | lock request | access | (lower boundary equal sign)? node operation | | | lower edge scan (upper boundary) | lock release |
| | | | | | | | (anchor)? | upper lock release | lower edge scan(lower/upper boundary) | edge marking |
| | (C-d type)? | | !(last level)? | lock request | access | | (anchor)? | upper lock release | lower edge scan(lower/upper boundary) |
| | | | | | | | !(anchor)? | | lower edge scan(lower/upper boundary) | lock release |
| | | | (last level)? | lock request | access | | (anchor)? | upper lock release | lower edge scan(lower/upper boundary) | edge marking |
| | | | | | | | !(anchor)? | | lower edge scan(lower/upper boundary) | lock release |

FIG. 19

| | | | | | | |
|---|---|---|---|---|---|---|
| (R area)? | | lock request | access | | | lower edge scan(lower/upper boundary) | edge marking |
| (L area)? | | lock request | !(p_anchor)? p_lock release | access | | (anchor)? | upper lock release | lower edge scan (lower boundary) | edge marking |
| | | | | | | !(anchor)? | | lower edge scan (lower boundary) | |
| | !(last level)? | lock request | !(p_anchor)? p_lock release | access | | (anchor)? | upper lock release | lower edge scan (full) | edge marking |
| | (last level)? | lock request | !(p_anchor)? p_lock release | access | (lower boundary equal sign)? node operation | !(anchor)? | | lower edge scan (full) | (iteration completion)? upper lock release + lock release + next iteration setting |
| (N area)? | | lock request | | access | node operation | (anchor)? | upper lock release | lower edge scan (full) | edge marking |
| | | | | | | !(anchor)? | | lower edge scan (full) | (iteration completion)? upper lock release + lock release + next iteration setting |
| (U area)? | !(last level)? | lock request | !(p_anchor)? p_lock release | access | node operation | (anchor)? | upper lock release | lower edge scan (upper boundary) | edge marking |
| | | | | | | !(anchor)? | | lower edge scan (upper boundary) | |
| | (last level)? | lock request | !(p_anchor)? p_lock release | access | (upper boundary equal sign)? node operation | | | | upper lock release + lock release |
| (C area)? | (C-c type)? | !(lower/upper boundary equal sign)? | | | | | | | upper lock release + lock release |
| | | (lower/upper boundary equal sign)? | | | | | | | upper lock release + lock release |
| | (C-a type)? | !(last level)? | lock request | !(p_anchor)? p_lock release | access | | (anchor)? | upper lock release | lower edge scan(lower/upper boundary) | |
| | | | | | | | !(anchor)? | | lower edge scan(lower/upper boundary) | |
| | | (last level)? | lock request | | access | node operation | | | | upper lock release + lock release |
| | (C-b type)? | !(last level)? | lock request | !(p_anchor)? p_lock release | access | | (anchor)? | upper lock release | lower edge scan (upper boundary) | edge marking |
| | | | | | | | !(anchor)? | | lower edge scan (upper boundary) | |
| | | (last level)? | lock request | !(p_anchor)? p_lock release | access | (lower boundary equal sign)? node operation | (anchor)? | upper lock release | lower edge scan(lower/upper boundary) | edge marking |
| | (C-d type)? | | lock request | !(p_anchor)? p_lock release | access | | (anchor)? | upper lock release | lower edge scan(lower/upper boundary) | edge marking |
| | | | | | | | !(anchor)? | | lower edge scan(lower/upper boundary) | |

FIG. 20

METHOD AND APPARATUS FOR CONTROLLING ACCESS TO TRIE DATA STRUCTURE

CROSS REFERENCE TO RELATED APPLICATIONS

This application claims the benefit of Korean Patent Application No. 10-2020-0026565 filed on 3 Mar. 2020 in the Korean Intellectual Property Office, the disclosure of which is incorporated herein by reference in its entirety.

BACKGROUND

1. Field of the Invention

Example embodiments relate to a method and apparatus for controlling an access to a trie data structure.

2. Description of Related Art

Computer-managed data is structured and stored in a memory unit of a computer. A process, which is an operation unit that executes a computer program, may access structured data stored in a computer and perform operations of reading, writing and deleting data. A data structure includes a stack, a queue, and a tree depending on a shape thereof.

Several processes may be executed simultaneously in a computer. Thus, when the several processes access a data structure concurrently, a collision and an interference may occur in performing an operation that changes the data structure between processes. A concurrency control technology for the data structure is a technology that manages access permissions so that data can be read, written, or deleted by accessing one data structure in order to stably run a program by preventing the collision and interference of the several processes. As for the data structure concurrency control technology, it is necessary to consider a form of the data structure, and there is need for a technology for securing concurrency that does not greatly decrease an operation speed of the data structure while preventing the collision and interference between the several processes.

SUMMARY

An aspect provides a method for dividing one trie data structure into small groups that are independently capable of acquiring access permissions.

Another aspect provides a technology for acquiring permissions to access respective groups divided from one trie-structure and performing an operation.

According to an aspect, there is provided a method for controlling an access to a trie data structure through an iteration operation that processes at least one window, the method including accessing a window initiating node in a trie, and determining whether a next node is an anchor node while visiting lower nodes of the window initiating node in a predetermined traversal order. When the next node is an anchor node, the method may include locking the next node that is an anchor node, releasing a lock of the window initiating node, when the window initiating node is an anchor node, and setting the next node that is an anchor node as a new window initiating node.

When a traversal of the lower nodes of the window initiating node is completed, the method may further include releasing the lock of the window initiating node, if the window initiating node is an anchor node, and setting a lower boundary value for a next iteration operation so as to indicate a next node of a last node among the lower nodes in the trie, based on the traversal order.

The determining of whether the next node is the anchor node may include comparing a threshold value to the number of child nodes of the next node, and determining whether the next node is an anchor node, based on a result of the comparison.

The accessing of the window initiating node may include searching for, based on a lower boundary value of the iteration operation, the window initiating node starting from a root node in the trie. When an anchor node is found while searching for the window initiating node, the anchor node may be locked and an upper lock may be released.

The accessing of the window initiating node may include locking the window initiating node, when the window initiating node is a root node.

The locking of the next node may include requesting the lock on the next node, and acquiring the lock in response to the request. The locking of the next node may further include waiting until the lock is acquired, after requesting the lock.

The threshold may be set differently for each next node.

In a crabbing mode, the determining of whether the next node is the anchor node may include, so as to visit the lower nodes in the predetermined traversal order, locking the next node, releasing a lock of a current node, and accessing the next node. In the crabbing mode, when the next node is an anchor node, the locking of the next node may not be performed.

The releasing of the lock of the current node may include maintaining the lock of the current node, when the current node is an anchor node, and releasing the lock of the current node regardless of whether the current node is an anchor node.

The method may further include maintaining, when a parent node of the next node is an anchor node, a lock of the parent node, and releasing the lock of the parent node regardless of whether the parent node is an anchor node, when the next node is an anchor node.

The method may further include storing data stored in the trie according to the traversal order. The method may further include outputting the data stored in the trie according to the traversal order.

The method may further include receiving data to be updated in the trie, accessing a node corresponding to the data to be updated in the trie by searching the trie using an exclusive lock, and updating the node. When an anchor node is found while searching for the node corresponding to the data to be updated, the exclusive lock may be placed on the anchor node and an upper exclusive lock may be released.

The predetermined traversal order may include an order based on a depth first search (DFS) method.

According to another aspect, there is provided a method for controlling an access to a trie data structure through an iteration operation, the method including determining an area type to which a next node belongs among a plurality of area types predetermined for the iteration operation, requesting a lock on the next node, accessing the next node in response to acquiring the lock, performing a leaf check of the next node depending on the area type, and performing a lower edge scan of the next node, based on a scan range depending on the area type.

When the next node is an anchor node, an upper lock may be released while the lock is maintained, and when the next node is not an anchor node, the lock may be released while the upper lock is maintained.

The area type may include at least one of an R type corresponding to a root node, an L type corresponding to a node indicating a lower boundary value, a U type corresponding to a node indicating an upper boundary value, an O type corresponding to a node exceeding the upper boundary value, a C type corresponding to a common node of the lower boundary value and the upper boundary value, and an N type corresponding to a node between the lower boundary value and the upper boundary value.

The performing of the leaf check may include skipping a check of whether the next node is a leaf node that stores data, when the area type corresponds to one of an R type, an intermediate level of an L type, a final level of the L type when performing an iteration operation without an equal sign in a lower boundary value condition, a final level of a U type when performing the iteration operation without the equal sign in an upper boundary value condition, and an intermediate level of a C type.

When the next node is an anchor node, the performing of the lower edge scan of the next node may include marking a lower edge being visited, so as to set a lower boundary value of a next iteration operation.

The performing of the lower node scan may include visiting a node connected to a lower edge within the scan range, visiting a node of a next lower edge within the scan range, when a visit to the node connected to the lower edge is completed and returned, and releasing the upper lock and setting a lower boundary value for a next iteration operation based on edge marking information, when there is no scannable lower edge within the scan range.

When the iteration operation corresponds to a write operation, the scan range depending on the area type may indicate at least one node for the write operation. The performing of the lower edge scan may include visiting, when there is a lower edge corresponding to the scan range, a node of the lower edge to set the node as a leaf node, and creating, when there is no lower edge corresponding to the scan range, a node of the lower edge to set the node as a leaf node.

When the iteration operation corresponds to a delete operation, the scan range depending on the area type may indicate at least one node for the delete operation. The performing of the lower edge scan may include visiting, when there is a lower edge corresponding to the scan range, a node of the lower edge to release a leaf node of the node, performing a garbage collection of the node, and setting a lower boundary value of a next iteration operation based on one of a lower boundary value of the iteration operation or a last lower edge without visiting a node of the last lower edge, when the next node is an anchor node.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 8 to 14 are diagrams illustrating a process in which a method for controlling an access to a trie according to an example embodiment operates, when a process that performs a delete operation and a process that performs a search operation simultaneously access a trie;
FIG. 17D is a diagram illustrating a data structure of a traversal result list according to an example embodiment;
FIG. 17E is a diagram illustrating a data structure of a sub-anchor node identifier according to an example embodiment;
FIG. 18 is a diagram illustrating a configuration of an operation processor according to an example embodiment;
FIG. 19 is a diagram illustrating example embodiments in which processing is performed differently for each area to which a next visited node belongs according to an example embodiment;
FIG. 20 is a diagram illustrating example embodiments in which processing is performed differently for each area to which a next visited node belongs when processes use different anchor node conditions according to an example embodiment.

DETAILED DESCRIPTION

The following structural or functional descriptions are exemplary to merely describe example embodiments, and the scope of the example embodiments is not limited to the descriptions provided in the present specification. Various changes and modifications can be made to the example embodiments by one skilled in the art.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
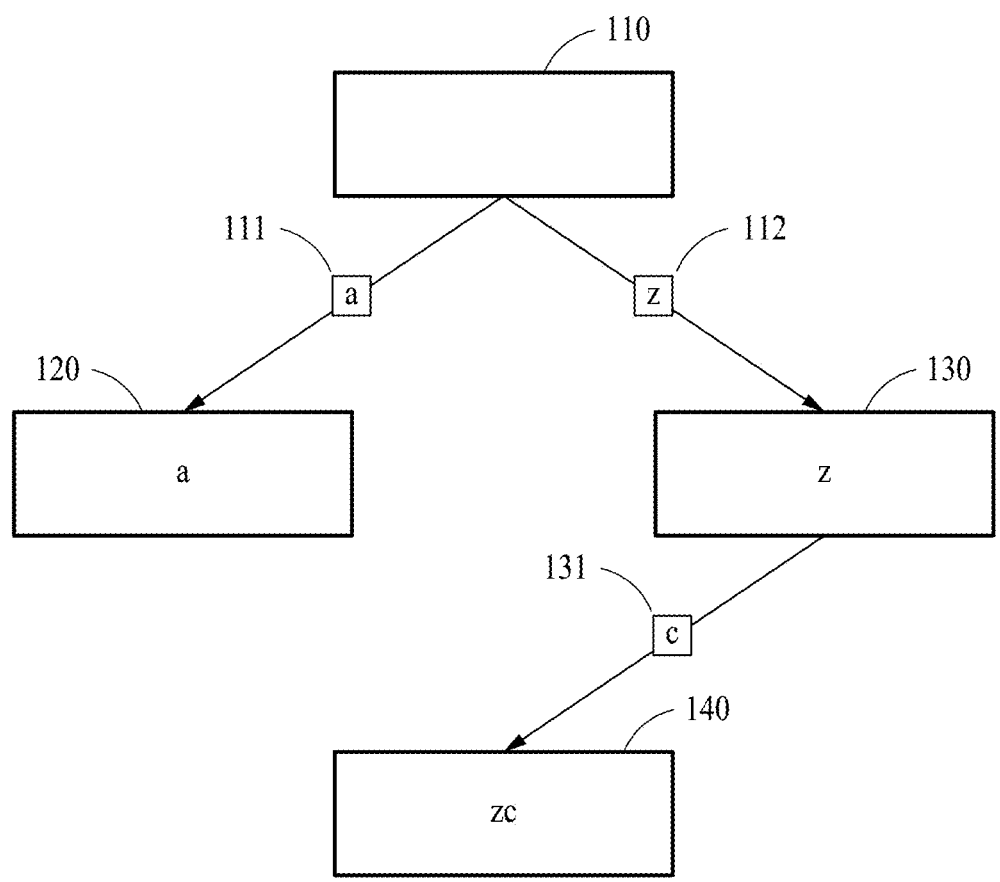
FIG. 1 is a diagram illustrating a trie data structure.

FIG. 1 is a diagram illustrating a trie data structure.

The trie data structure, which is a type of data structure in which data is stored, may belong to a trie structure including a node in which data is stored and an edge that connect nodes. When searching for data stored in a trie, a search operation may have a time complexity as much as a length of data to be searched. For example, when searching for a character string with a length m in a trie storing a set of character strings, the time complexity of the search operation may be O(m). Hereinafter, the tri data structure may be referred to as a trie structure or a trie.

Referring to FIG. 1, the trie structure according to an example embodiment may include nodes 110, 120, 130, and 140 and edges 111, 112, and 131 that connect the nodes. Two nodes connected by one edge may correspond to a parent node or a child node depending on a connection relationship. For example, the node 110 may correspond to a parent node of the nodes 120 and 130, and conversely, the node 120 and the node 130 may correspond to child nodes of the node 110. A root node according to an example embodiment may be a node that does not have a parent node. For example, the node 110 may correspond to a root node because there is no parent node. Hereinafter, unless otherwise specified as a root node, node(s) or node(s) included in a trie may represent node(s) excluding the root node.

According to an example embodiment, a leaf node may represent a node in which data is stored. Depending on how to implement, a trie according to an example embodiment may be implemented so that data is stored only in nodes that do not have a child node, or so that data is also stored in nodes that have a child node. When the trie according to an example embodiment is implemented so that data is stored only in node(s) that do not have a child node, the leaf node may represent nodes that do not have a child node. However, when the trie according to an example embodiment is implemented so that the data is also stored in nodes that have a child node, the leaf node may represent nodes in which data is stored as well as nodes that do not have a child node. For example, when the trie is implemented so that data is stored only in node(s) that do not have child nodes, the leaf node may represent the nodes 120 and 140 that do not have a child node. For another example, when data is also stored in a node with a child node, a character string z may be stored in the node 130, and when a character string is stored in the node 130, the node 130 may also correspond to a leaf node. In this case, each node may store information indicating whether a node is a leaf node that stores data (a character string).

Levels of nodes included in a trie structure may be determined depending on the number of edges connected from a root node to a corresponding node. For example, a level of the root node may be −1, levels of the nodes 120 and 130 connected to the root node with one edge may be 0, and a level of the node 140 connected to the root node with two edges may be 1.

Depending on the example embodiment, a method for storing data in a trie may be various. For example, a trie structure may be implemented so that data is stored in all nodes, or so that data is stored only in leaf node(s). Even in a trie structure implemented so that data is stored only in leaf node(s), all nodes excluding a root node may have corresponding data values. Data corresponding to a node may be determined by data corresponding to a parent node and an edge value connecting a child node to the parent node. For example, referring to the trie structure storing a character string set of FIG. 1, data corresponding to the node 120 may be a character string a because the node 120 is connected to the parent node 110 by an edge 111 with an edge value of a, and data corresponding to the node 130 may be a character string z because the node 130 is connected to the parent node 110 by an edge 112 with an edge value of z. The node 140 may be connected to the parent node 130 by an edge 131 with an edge value of c, and data corresponding to the parent node 130 may be a character string z, and thus data corresponding to the node 140 may be a character string zc.

A trie described below with reference to the drawings may be a trie in which character strings are stored. In the drawings, a character indicated in a node may correspond to an edge value of an edge connected from a parent node to a child node, and a character string corresponding to the node may be determined based on a character string corresponding to the parent node and the edge value of the edge connected from the parent node. For example, when a level of a root node is −1, a character string corresponding to a node located at level 0 may correspond to an edge value of an edge connected from the root node to the node. In a character string corresponding to a node located at level 1, a first character may correspond to a character corresponding to a parent node, and a second character may correspond to a character string corresponding to an edge value of an edge connected from the parent node. In tries illustrated in the drawings below, edge values may be indicated in child nodes for simplicity.

Figure 2:
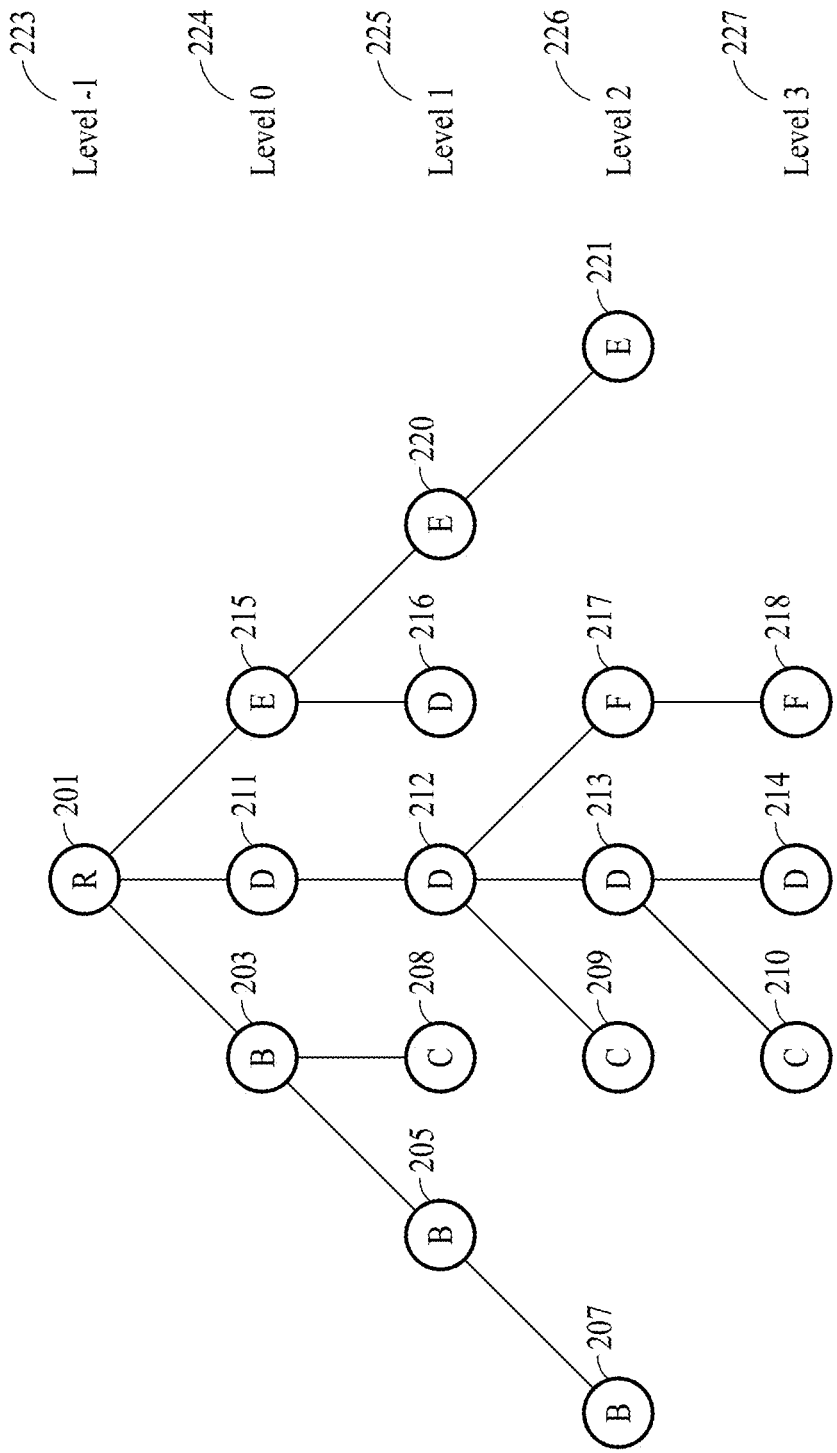
FIG. 2 is a diagram illustrating a trie storing character string data.

FIG. 2 is a diagram illustrating a trie storing character string data.

Referring to FIG. 2, a node 201 in which R is indicated may represent a root node, and characters indicated inside nodes excluding the root node each may represent an edge value of an edge connecting a parent node to a corresponding node. Data stored in a trie according to an example embodiment each may be stored in a leaf node, and data stored in the leaf node may correspond to permutations of edge values included in paths connecting the root node to respective leaf nodes. For example, leaf nodes included in the trie illustrated in FIG. 2 may include character strings B 203, BB 205, BBB 207, BC 208, D 211, DD 212, DDC 209, DDD 213, DDDC 210, DDDD 214, DDF 217, DDFF 218, E 215, ED 216, EE 220, and EEE 221 may be stored. Depending on the example embodiment, some of the nodes of FIG. 2 may not be leaf nodes. For example, when a character string BB is not stored in the trie, BB 205 may exist as an intermediate node for storing BBB 207, and may store a false value as information indicating whether BB 205 is a leaf node.

According to an example embodiment, a lower node of a specific node may include child node(s) of the specific node, and may include child node(s) of node(s) included in the lower node of the specific node. For example, a lower node of a node 203 may include child nodes 205 and 208 of the node 203 and a child node 207 of the node 205 included in the lower node. A node 212 may have a higher level than that of the node 203, however, may not be included in the lower node of the node 203.

A process executed by accessing a trie data structure may include traversal, search, add, delete, and modification operations.

The traversal operation may be an operation that visits nodes included in a trie according to a predetermined traversal order. For example, the traversal operation may correspond to an operation that visits all nodes included in the trie in an order based on a depth first search (DFS). In order to traverse the nodes included in the trie at least once according to the traversal operation of the trie according to an example embodiment, some nodes may be visited multiple times. For example, when traversing the trie of FIG. 1 according to the order based on the DFS, the node 110 may be visited to implement an operation of traversing the node 130 according to a next traversal order after traversing the node 110 and the node 120 in sequence. That is, in order to implementation a traversal order and a traversal process according to an example embodiment, an order of actually visited nodes may not be the same.

According to an example embodiment, visiting nodes including a root node in a process of traversing a trie may include securing a permission to access a node to be visited. When securing the permission to access a node, the node may be visited. However, when the access permission is not secured, an operation may be held in a waiting state until the permission to access the node is secured. In order to secure the access permission, a shared lock may be used for a read operation, and an exclusive lock may be used for a write operation or a delete operation.

Data corresponding to the nodes visited while traversing the trie may be stored or outputted according to the traversal order. When a lower boundary value or an upper boundary value is provided as an operation condition, the traversal operation according to an example embodiment may include a range traversal operation performed within a range. For example, when an upper boundary value of a range in which a traversal is performed in ascending order is provided in a trie in which character strings are stored, the traversal may be terminated when a character string corresponding to the upper boundary value is searched while traversing the trie in ascending order. For another example, a lower boundary value and an upper boundary value of a range in which a traversal is performed in ascending order are provided in a trie in which character strings are stored, the traversal operation may be performed from a node storing a character string corresponding to the lower boundary value to a node storing a character string corresponding to the upper boundary value. The range traversal operation according to an example embodiment is described in detail below.

The search operation may be an operation that searches for specific data while traversing a trie, and may correspond to, for example, an operation that searches for a specific character string stored in the trie while traversing the trie storing character strings. In order to search for a specific character string in the trie in which the character strings are stored, an edge value connecting a root node to a child node may be identified, and an edge value connecting the child node to a child node of the child node may be sequentially identified. When a character string stored in a leaf node corresponds to the specific character string or there is no more child node, the search operation may be terminated. The search operation performed in the trie according to an example embodiment may include an operation of searching while securing a permission to access a node. For example, when a permission to access the root node is secured, the root node may be accessed and the edge value connecting the root node to the child node may be identified. When the character string stored in the leaf node corresponds to the specific character string, and the search operation is terminated accordingly, a search result indicating a search success may be outputted. In this case, the search result may include data corresponding to a node where the search succeeds and data corresponding to lower nodes connected to the node where the search succeeds. When the search operation is terminated because there is no child node, the search may fail and information indicating a search failure may be outputted.

The add operation may be an operation that searches for additional target data in a trie, and when the search fails, creates a node in which the additional target data stores, and adds the node to the trie. For example, the add operation may correspond to an operation of searching for an additional target character string in a trie in which character strings are stored, and when the search fails, adding a node in which the additional target data is stored as a child node of a node where the search is terminated. Data according to an example embodiment may be stored in the trie by repeating a process of connecting a child node starting from a root node by using an edge with an edge value corresponding to data to be stored. For example, in the trie illustrated in FIG. 2, a character string BB may connect the child node 203 from the root node 201 by using an edge with an edge value of B, and may connect again the child node 205 from the node 203 by using the edge with the edge value of B, thereby being stored in the trie. When the search for the additional target data succeeds in the trie according to an example embodiment, the add operation may be terminated.

The delete operation may be an operation that deletes specific data from a trie, and may correspond to, for example, an operation of deleting a specific character string from a trie in which character strings are stored. In the trie, a search operation on specific data may be performed before the delete operation. When the search succeeds, data stored in a node where the search is terminated may be deleted, and when there is no child node of the node where the search is terminated, the node may be deleted. When there is no child node of a parent node where the search is terminated by deletion of the node where the search is terminated, the parent node may be deleted. Such a process may be repeated up to a root node, however, the root node may not be deleted even when the root node has no child node. When there is a child node of a node where the search succeeds, data stored in the node where the search succeeds may be deleted. In this case, the node where the search succeeds may no longer correspond to a leaf node.

The modification operation may be an operation that changes specific data in a trie, and may correspond to, for example, an operation of changing a specific character string into another character string in a trie in which character strings are stored. According to an example embodiment, the modification operation may correspond to an operation of performing an add operation after performing a delete operation. For example, an operation of modifying a character string AB into a character string AC in a trie in which character strings are stored may correspond to an operation of adding the character string AC after performing an operation of deleting the character string AB from the trie. According to an example embodiment, the modification operation may correspond to an operation of searching for a character string to be modified in the trie and then modifying data stored in a node where the search is terminated.

Hereinafter, the read operation may be an operation that accesses a trie and loads data stored in the trie, and may include the above-described traversal operation and search operation, and the write operation may be an operation that accesses the trie and changes data stored in the trie, and may include the above-described add operation, modification operation, and delete operation.

Figure 3:
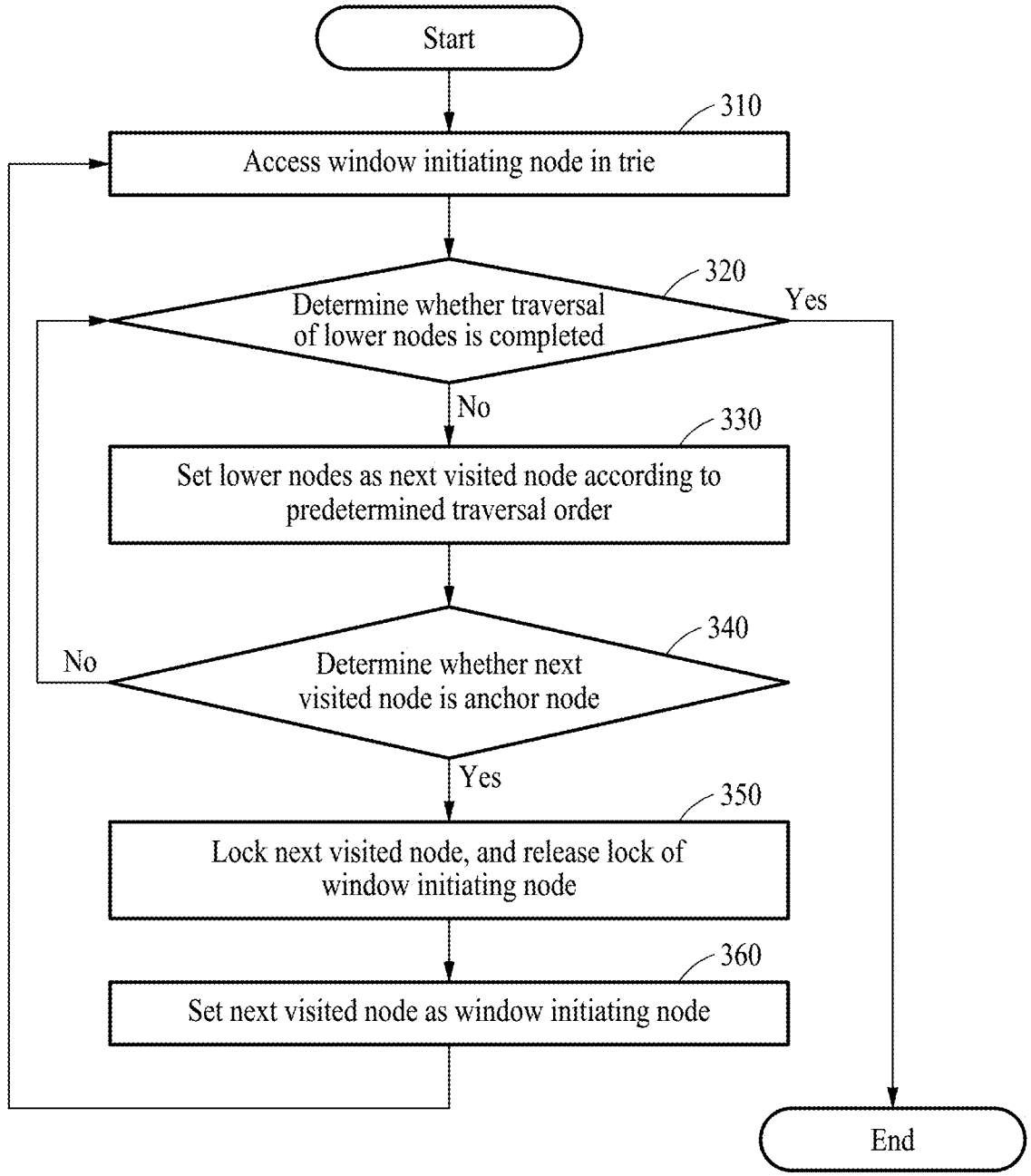
FIG. 3 is a diagram illustrating a method for controlling an access to a trie data structure according to an example embodiment.

FIG. 3 is a diagram illustrating a method for controlling an access to a trie data structure according to an example embodiment.

Controlling an access to a trie structure according to an example embodiment may represent changing a permission to access node(s) included in a trie while visiting the node(s) included in the trie for an operation on the trie. Hereinafter, a node being currently visited may be referred to as a current node or a current visited node, and a node to be visited next may be referred to as a next node or a next visited node. Similarly, a node visited previously may be referred to as a previous node or a previous visited node.

The method for controlling an access to a trie structure according to an example embodiment may include at least one iteration operation process. The iteration operation according to an example embodiment may represent a process in which one process performs an operation of dividing one trie into small groups and visiting node(s) on a corresponding group, and an operation on the entire trie may include one or more iteration operations. In addition, one or more windows may be processed based on an anchor node in one iteration operation. In other words, the iteration operation according to an example embodiment may correspond to an operation of setting a predetermined specific node or a root nod as a window initiating node, and visiting the window initiating node and lower nodes while changing an access permission according to a predetermined traversal order. That is, the window initiating node may represent an initiating node of a window processed by the iteration operation according to an example embodiment, and may correspond to a predetermined node, or may correspond to a root node when not predetermined. The iteration operation according to an example embodiment may correspond to a series of processes that process one or more windows defined from a window initiating node to a newly set window initiating node under the window initiating node or a last leaf node that is a lower node of the window initiating node while changing an access permission of a node according to the predetermined traversal order.

According to an example embodiment, a trie may be divided into at least one group including nodes visited by progress of at least one iteration operation. A process of dividing the trie into at least one group according to the iteration operation is described in detail below with reference to FIGS. 6 and 7.

When a permission to access a node is acquired, an anchor node according to an example embodiment may be a node that is capable of acquiring permissions to access all lower node(s) of the node, and may be determined by comparing the number of child nodes among nodes included in a trie and a threshold to each other.

In classifying anchor nodes, an anchor node that does not have another anchor node in a lower node thereof may be defined as a leaf anchor node, a node that does not satisfy an anchor node condition, but has two or more child nodes may be a sub-anchor node, and a node that has one child node may be defined as a normal node. However, when a condition for discriminating an anchor node is given as two or more number of child nodes, a sub-anchor node may not exist. When there remains one or more number of lower nodes of an anchor node that have not been visited, and an anchor node has a largest level value among anchor nodes that have unvisited lower nodes according to an example embodiment, the anchor node may be defined as a branch off anchor node.

A process according to an example embodiment may secure or acquire an access permission by requesting a lock on a node of a trie from an operating system (OS). Hereinafter, locking a node, setting a lock on a node, securing an access permission, or acquiring an access permission may be interpreted as the process requesting a lock on the node from the OS and returning the lock.

According to an example embodiment, the process may request different types of locks depending on an operation type. For example, a process that performs a read operation on a trie may request a shared lock, and a process that performs a write operation on the trie may request an exclusive lock. Depending on a state of a node on which a lock is requested, the OS may return the requested lock or block the request without returning the requested lock until the lock already placed on the node is released.

When a process according to an example embodiment places an exclusive lock to a specific node, another process may not secure a permission to access the specific node. In this case, another process may not access the node until the process that has secured the exclusive lock terminates all operations on the node and releases the exclusive lock. Therefore, when the exclusive lock is placed on the specific node, another process may not secure the exclusive lock or shared lock with respect to the node. Another process may secure the exclusive lock or shared lock on the node after the exclusive lock of the node is released.

When a process according to an example embodiment places a shared lock on a specific node, the process(es) requesting the shared lock on the specific node may access the node, however, the process requesting an exclusive lock may not access the node until the shared lock is released. For example, even when the shared lock is set on the specific node, another process may secure the shared lock with respect to the node. Conversely, when the shared lock is set on the specific node, another process may not secure the exclusive lock with respect to the node. Another process may acquire the exclusive lock on the node after all shared locks on the node are released.

Hereinafter, for convenience of description, a lock set on a specific node by a process is described as an exclusive lock, however, a type of lock is not limited thereto, as described above.

According to an example embodiment, when a process requests a lock on a specific node included in a trie so as to perform an operation on a trie data structure, the OS may return the lock to the process on the specific node when the lock is not placed on the specific node (when the lock is released). In this case, it can be understood that an access permission of the process for the specific node is secured. Conversely, when the specific node is locked, the access permission may be granted or may not be granted depending on a type of lock set on the node and a type of lock requested on the node. For example, when a shared lock is placed on the specific node, the access permission may be granted without delay when the shared lock is requested with respect to the node. However, when an exclusive lock is requested, the access permission may not be granted until the shared lock of the node is released. In addition, when the exclusive lock is placed on the specific node, the access permission that has been requested by the shared lock or the exclusive lock may not be granted until the exclusive lock of the node is released. When the permission to access the specific node is not granted, the process may hold an access to the node for performing an operation until the requested access permission is secured.

Referring to FIG. 3, the method for controlling an access to a trie data structure according to an example embodiment may include accessing a window initiating node in a trie (operation 310), determining whether a next visited node is an anchor node while traversing lower nodes of the window initiating node in a predetermined traversal order (operation 340), when the next visited node is an anchor node, locking the next visited node that is an anchor node, and releasing a lock of the window initiating node (operation 350), and setting the next visited node that is an anchor node as the window initiating node (operation 360). The releasing of the lock of the window initiating node (operation 350) according to an example embodiment may include releasing the lock when the window initiating node is an anchor node or a root node.

According to an example embodiment, accessing a node may represent that a process accesses a data structure so as to perform an operation on a trie. For example, accessing a node may represent that a process accesses a node so as to perform an operation of reading, modifying, or deleting data stored in the node, or adding a child node to the node. In another example, accessing a node may comprehensively include an operation of visiting a next node (for example, an initiating node of a next window of a current processing window) in the same iteration operation, or an operation of searching for and visiting a node that satisfies a lower boundary condition during a next iteration operation.

The accessing of the window initiating node (operation 310) according to an example embodiment may include locking the window initiating node when the window initiating node is a root node or an anchor node. Locking a node according to an example embodiment may include requesting a lock on the node from the OS and acquiring the lock in response to the request. According to an example embodiment, the requesting of the lock from the window initiating node may further include waiting until the lock is acquired. According to an example embodiment, when an access permission is secured by acquiring the lock on the window initiating node, an operation on the trie may be performed by accessing the window initiating node, and when there is no permission to access the window initiating node, progress of the operation may be held until the access permission is secured.

The determining of whether the next visited node is an anchor node (operation 340) according to an example embodiment may correspond to determining whether the next visited node is an anchor node while traversing the lower nodes of the window initiating node in the predetermined traversal order. The determining of whether the next visited node is an anchor node (operation 340) according to an example embodiment may include comparing the number of child nodes and a threshold value of the next visited node and determining, based on a comparison result, whether the next visited node is an anchor node. According to an example embodiment, the root node may be determined as an anchor node regardless of the number of child nodes. The anchor node according to an example embodiment may be determined by comparing the number of child nodes among nodes included in the trie and the threshold value to each other.

According to an example embodiment, the threshold to be compared to the number of child nodes may be set equally for all nodes including the root node included in the trie, or may be set differently for each node that is traversed by the process. For example, when a node with M or more child nodes is determined as an anchor node, a value of M may be defined as an arbitrary positive integer value of 2 or more, and the value of M may be set differently for each process that performs an operation on the trie, and may be set differently for each node that one process traverses. More specifically, for example, the threshold value may be equally set to 2 for all nodes, or the threshold value may be set to increase by 1 as a level increases by 1 based on a threshold value 1 for the root node.

Operation 340 according to an example embodiment may include setting lower nodes of the window initiating node as the next visited node according to the predetermined traversal order (operation 330). The setting of the lower nodes of the window initiating node as the next visited node (operation 330) according to an example embodiment may include accessing the next visited node, that is, may include visiting the next visited node to perform an operation of reading or writing data. The traversal order according to an example embodiment may be predetermined, and may include, for example, a traversal order by a DFS, and an ascending order and a descending order of data corresponding to a node. Hereinafter, the traversal order is described by taking the traversal order based on the DFS as an example, but the traversal order according to an example embodiment is not limited thereto.

According to an example embodiment, prior to setting the next visited node, determining whether a traversal of the lower nodes of the window initiating node is completed (operation 320) may be included. When a traversal for lower node(s) of a specific window initiating node is completed during an iteration operation according to an example embodiment, nodes belonging to one or more windows processed in the iteration operation may correspond to one group. Nodes in the same group may be processed (traversed) without changing a process. A group may be determined differently depending on a threshold for determining an anchor node according to an example embodiment, and such a process is described below in detail with reference to FIGS. 6 and 7.

When it is determined that the next visited node is not an anchor node in operation 340 according to an example embodiment, operations 320 and 330 according to the traversal order may be performed again. In this case, the next visited node that is newly set in operation 330 may correspond to a next node of a previous next visited node.

The locking of the next visited node and the releasing of the lock of the window initiating node (operation 350) according to an example embodiment may be performed when it is determined that the next visited node is an anchor node in operation 340. Operation 350 according to an example embodiment may correspond to locking the next visited node that is a new anchor node, and releasing the lock of the window initiating node when the window initiating node is an anchor node or a root node. In other words, according to an example embodiment, when a specific node corresponds to an anchor node and a lock is set on the specific node by a process, even after the process accesses a lower node, the lock on the anchor node may be maintained until a new anchor node is found. Accordingly, a permission to access an anchor node of the process may be maintained in a secured state, and a permission to access an anchor node of another process may not be granted. However, when a node set with respect to an anchor node by a current process is a shared lock, the permission to access the anchor node of another process may be secured, when another process requests the shared lock.

The setting of the next visited node as the window initiating node (operation 360) according to an example embodiment may correspond to setting the next visited node as the window initiating node when it is determined that the next visited node is an anchor node in operation 340. When a new window initiating node is set by operation 360 according to an example embodiment, operation 310 according to an example embodiment may be performed again with respect to the new window initiating node. In other words, according to an example embodiment, when a new lower node that satisfies an anchor node condition is found while traversing lower nodes of the newly set window initiating node, the lower node may be set as the new window initiating node, and accordingly a lock may be placed on the lower node, and the lock of the existing window initiating node may be released.

When a specific anchor node is set as a window initiating node by a specific process, and a shared lock is set on the specific anchor node accordingly, another process using an exclusive lock may not access the node and lower nodes of the node, and may access the node and the lower nodes by securing access permissions after the lock of the node is released. However, another process using the shared lock may freely secure a permission to access the node, thereby accessing the node and the lower nodes.

When a specific anchor node is set as a window initiating node by a specific process and an exclusive lock is set on the specific anchor node accordingly, another process using the exclusive lock may not access the node and lower nodes of the node, and may access the node and the lower nodes by securing access permissions after the lock of node is released. In this case, another process using the shared lock may not secure the access permissions until the lock of the node is released.

Figure 4:
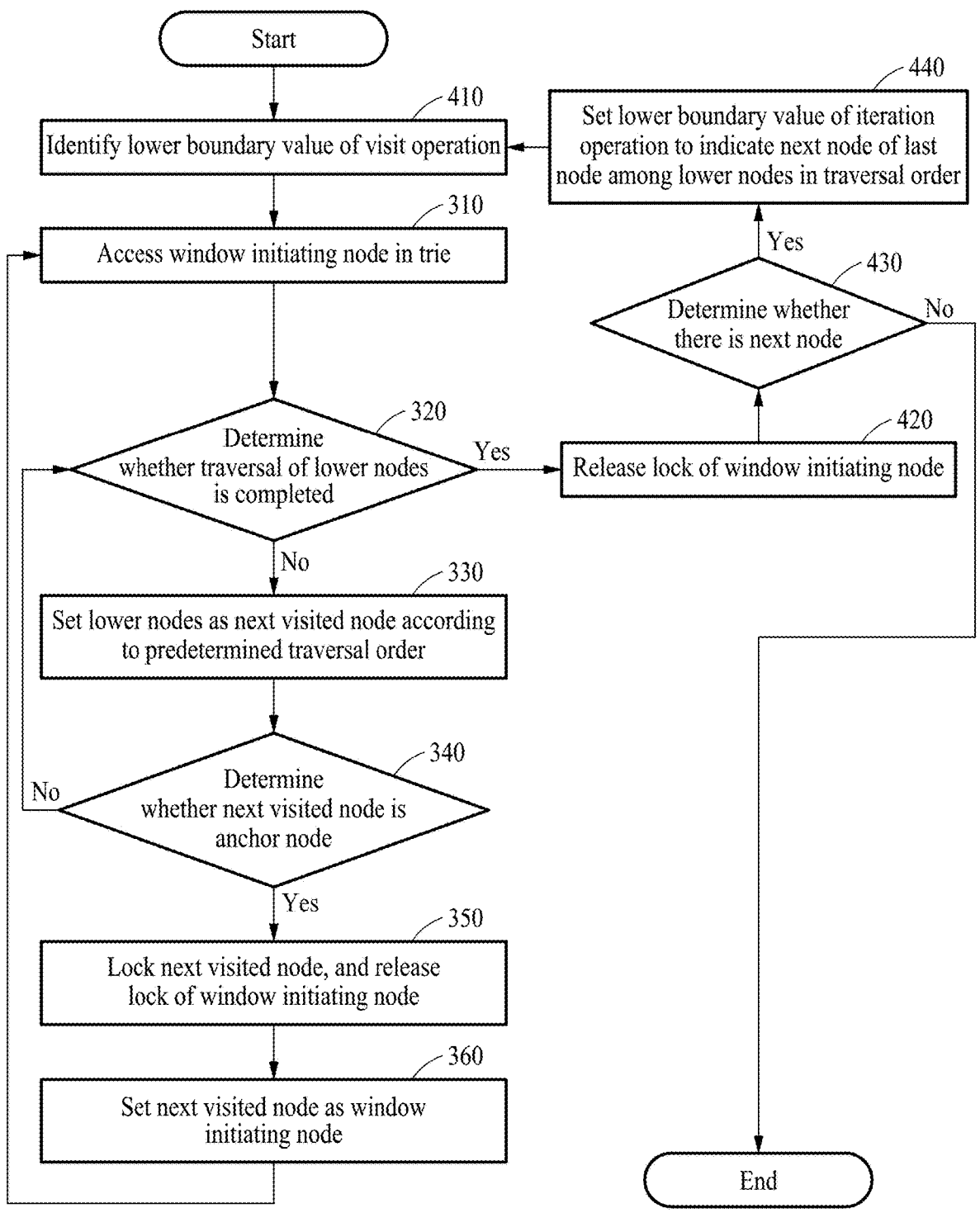
FIG. 4 is a diagram illustrating a detailed operation of the method for controlling an access to a trie data structure according to an example embodiment of FIG. 3.

FIG. 4 is a diagram illustrating a detailed operation of the method for controlling an access to a trie data structure according to an example embodiment of FIG. 3.

When the traversal of the lower nodes of the window initiating node is completed in operation 320 according to an example embodiment, that is, when a current visited node corresponds to a last node among the lower nodes of the window initiating node in the traversal order, there may be no lower node to be set as a next visited node according to the traversal order. In this case, when the window initiating node is an anchor node, operation 320 may further include releasing a lock of the window initiating node (operation 420) and setting, based on the traversal order, a lower boundary value of the next iteration operation, so as to indicate a next node of the last node among the lower nodes of the window initiating node in the traversal order (operation 440). For example, operation 440 may include setting the next node of the last node among the lower nodes of the window initiating node in the traversal order as the lower boundary value of the next iteration operation.

According to an example embodiment, when visiting a lower node of a window initiating node, the edge of that lower node may be marked so as to indicate the node is the last visited node under the current window initiating node. In this case, a lower boundary value of a next iteration operation may be set based on edge-marking information. For example, the lower boundary value of the next iteration operation may be set so that a character string greater than the edge-marking information is processed in the next iteration operation.

When there is no next node of the last node among the lower nodes of the window initiating node in the trie according to an example embodiment, a traversal operation may be terminated.

The next iteration operation may be performed starting from operation 410. The process may access, based on the lower boundary value identified in operation 310, the window initiation node in the trie. In the traversal process of visiting the window initiating node based on the lower boundary value in operation 310, an operation of locking the node and releasing an upper lock may be performed by checking whether a next visited node is an anchor node. The details will be described below. In the case of a first iteration operation, the lower boundary value may not be given. In this case, the window initiating node may be a root node.

Figure 5:
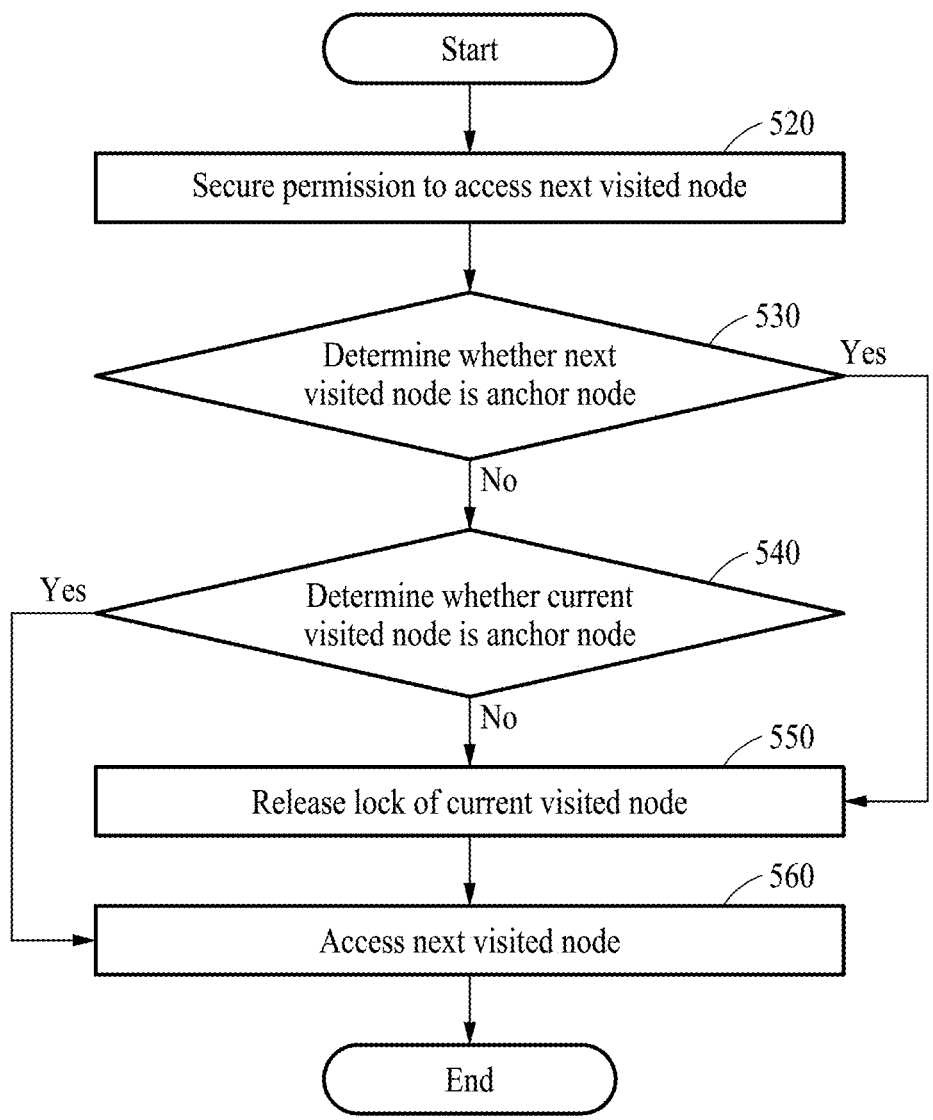
FIG. 5 is a diagram illustrating a method for controlling an access to a trie data structure while crabbing a node of a trie according to an example embodiment.

FIG. 5 is a diagram illustrating a method for controlling an access to a trie data structure while crabbing nodes of a trie according to an example embodiment.

According to an example embodiment, when a threshold value that is a criterion for determining whether a next visited node is an anchor node set based on a different criterion, an operation of crabbing nodes of a trie may be performed.

When performing the crabbing operation according to an example embodiment, the determining of whether the next visited node is the anchor node (operation 340) may include securing a permission to access the next visited node (operation 520), releasing a lock of a node currently being visited (operation 550), and accessing the next visited node (operation 560). As described above, the securing of the permission to access the next visited node (operation 520) may include waiting until a lock is requested on the next visited node from the OS and the lock is acquired.

The releasing of the lock of the current visited node (operation 550) according to an example embodiment may include, when the node being currently visited is an anchor node, maintaining the lock of the current visited node, and when the next visited node is an anchor node, releasing the lock of the current visited node regardless of whether the current visited node is an anchor node. In other words, prior to the releasing of the lock of the current visited node (operation 550) according to an example embodiment, the determining of whether the next visited node is an anchor node (operation 530) may be performed. Thus, when the next visited node is an anchor node, the releasing of the lock of the current visited node (operation 550) may be performed. When the next visited node is not an anchor node, the determining of whether the current visited node is an anchor node (operation 540) may be performed. According to an example embodiment, when the next visited node is not an anchor node and the current visited node is an anchor node, the accessing of the next visited node (operation 560) may performed without releasing the lock of the current visited node. According to an example embodiment, when the next visited node is not an anchor node and the current visited node is not an anchor node, after performing the releasing of the lock of the current visited node (operation 550), the accessing of the next visited node (operation 560) may be performed. That is, in order for a process to move from an upper node to a lower node and access the lower node, the process may move to the lower node after acquiring a permission to access the lower node. After acquiring the permission to access the lower node and moving to the lower node, a permission to access the previous upper node may be released. However, when the previous upper node corresponds to an anchor node, the process may maintain the permission to access the previous upper node without releasing the permission, and may release the access permission when moving to the lower node corresponding to a new anchor node.

Although not illustrated in the drawings, according to an example embodiment, when processes use the same threshold for an anchor node, a permission to access an upper node may be first released and then a movement may be performed before a permission to access a lower node is secured. However, when the upper node is an anchor node, the permission to access the lower node may be secured and a movement may be performed without releasing the permission to access the upper node, as described above.

The releasing of the lock of the current visited node (operation 550) according to an example embodiment may include, when a parent node of the next visited node is an anchor node, maintaining a lock of the parent node, and when the next visited node is an anchor node, releasing the lock of the parent node regardless of whether the parent node is an anchor node.

Figure 6:
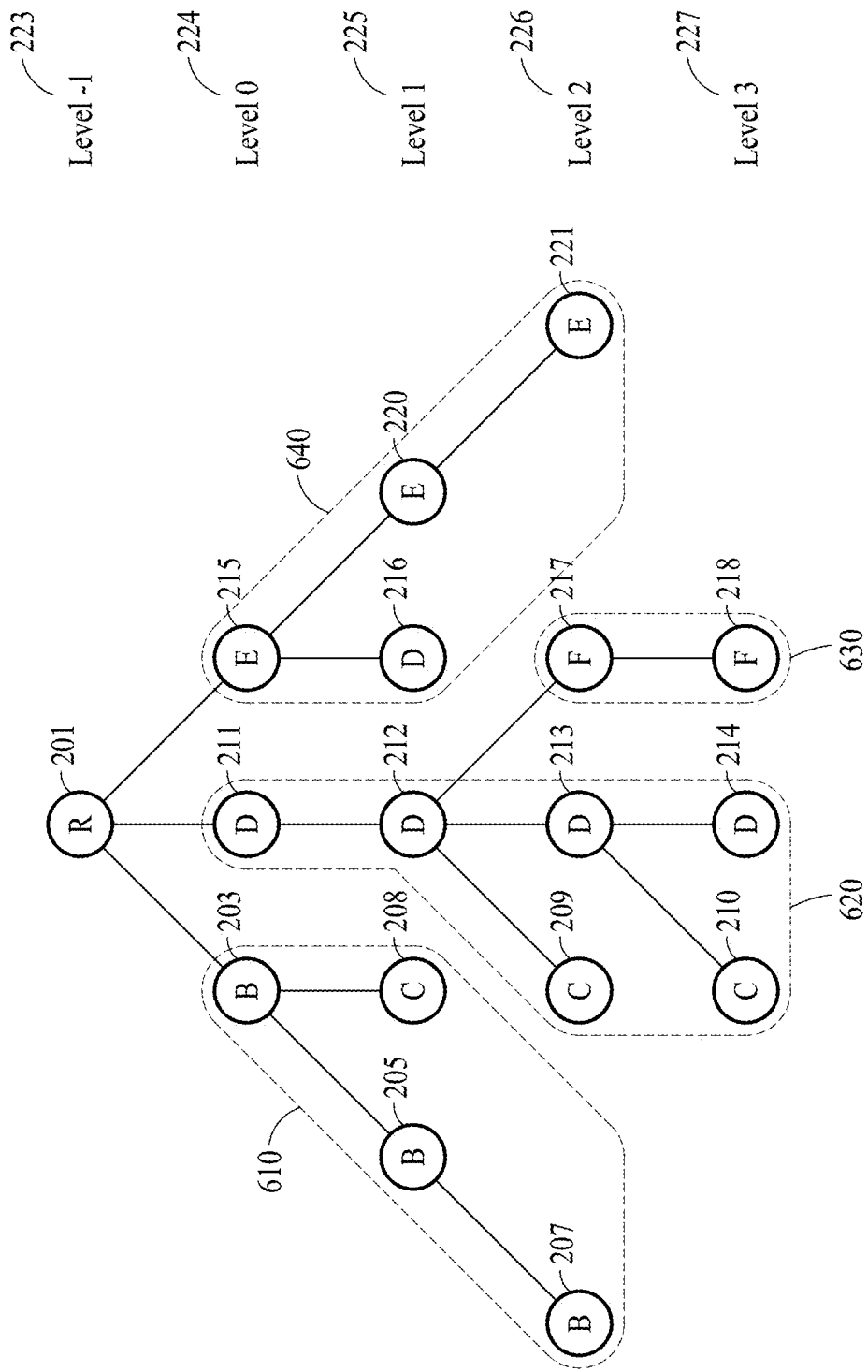
FIGS. 6 and 7 are diagrams illustrating a result of dividing a trie into at least one group by a process that traverses a trie according to a method for controlling an access to a trie data structure according to an example embodiment.
Figure 7:
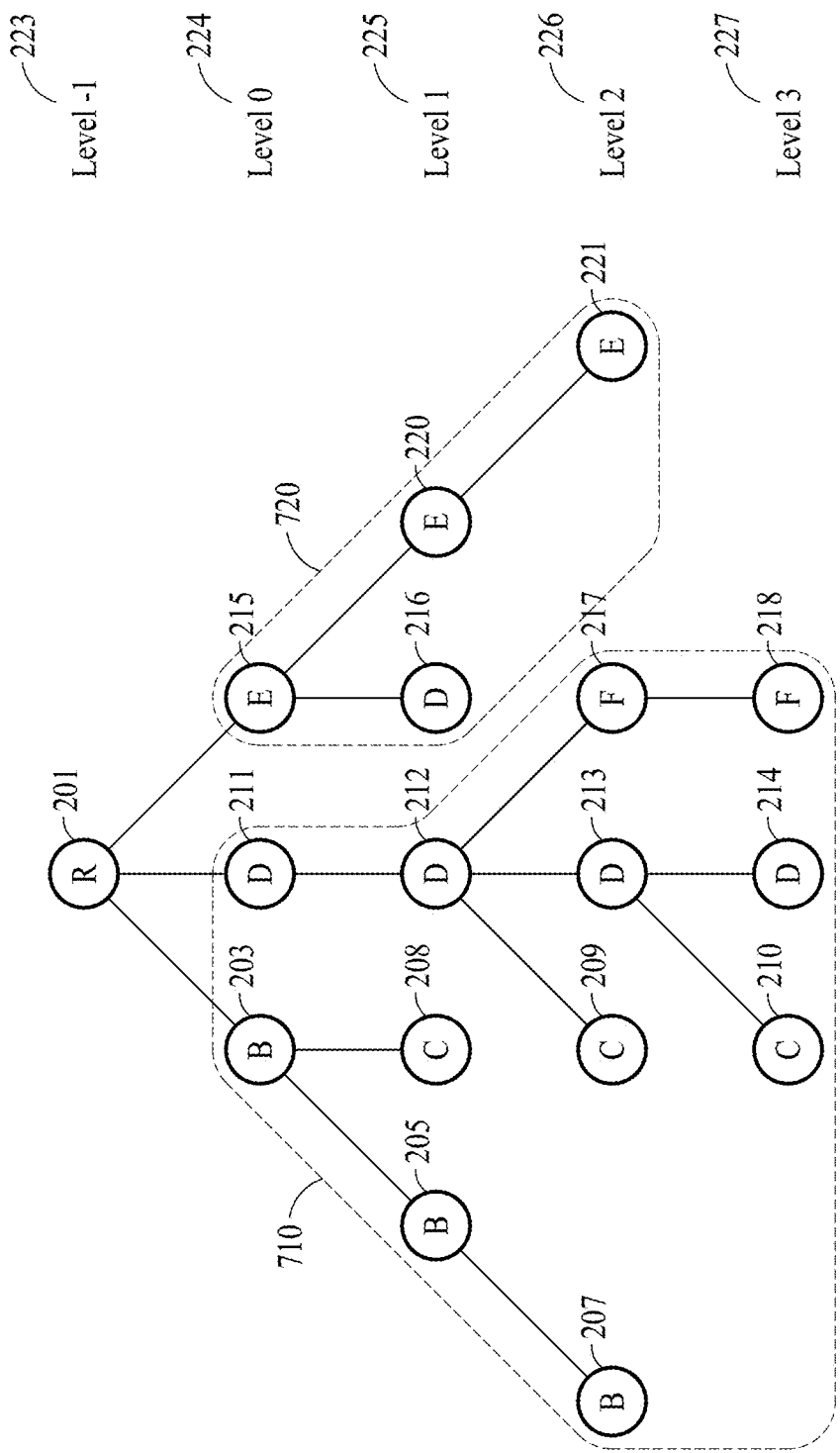

FIGS. 6 and 7 are diagrams illustrating a result of dividing a trie into at least one group by a process that traverses the trie while performing an iteration operation according to a method for controlling an access to a trie data structure according to an example embodiment.

More specifically, FIG. 6 illustrates a result of dividing a trie into four groups by a first process in which a threshold for determining an anchor node is set to 2 while traversing all nodes included in the trie according to an iteration operation according to an example embodiment. A trie traversal order of the process according to an example embodiment may be a traversal order based on a depth-first search, and when there are multiple child nodes, child nodes connected by an edge with a smaller edge value may be preferentially traversed.

Hereinafter, an operation process of the first process is described with reference to FIG. 6. Here, accessing a node may represent a process of securing a permission to access the node by requesting a lock on the node, and moving to the node.

A first window initiating node to be accessed by the first process may correspond to the root node 201. According to an example embodiment, a root node may be determined as an anchor node regardless of the number of child nodes. Thus, a root node 201 may be accessed in operation 310 by securing an access permission acquired from requesting a lock on the root node 201 which is the window initiating node. After accessing the root node 201 that is the window initiating node, a node B 203 may be set as a next visited node according to a traversal order by operation 330. The first process may request a lock on the next visited node B 203 to secure an access permission and access the next visited node B 203. Since the next visited node B 203 has two child nodes, the next visited node B 203 may be an anchor node. Therefore, the first process may release a lock of the window initiating node 201. In this case, the next visited node 203 may be set as a new window initiating node.

The next visited node may be set as a node BB 205, and the first process may access the node BB 205 by requesting a lock on the node BB 205 and acquiring a permission to access the node BB 205. Since the node BB 205 does not correspond to an anchor node, the first process may release the lock of the node BB 205. In the same manner, a node BBB 207 that is a next node according to the traversal order may be set as a next visited node. Since the node BBB 207 also does not correspond to an anchor node, a node BC 208 that is a next node may be set as a next visited node. In this case, since the node BBB 207 does not have a child node, the node BC 208 may be set as a next visited node after returning to the node B 203 that is an anchor node. The node BC 208 may not correspond to an anchor node, and as a result of traversing up to the node BC 208, a traversal of lower nodes of the node B 203 that is a current window initiating node may be completed, and thus nodes from the window initiating node 203 to the last lower node BC 208 may correspond to one group 610.

Since the traversal of the lower nodes of the current window initiating node 203 is completed, the lock of the window initiating node 203 may be released, and a node D 211 that is a next node of the last node BC 208 that has been traversed in the traversal order may be set as a lower boundary value for a next iteration operation. For example, when visiting from the root node 201 to the node B 203, a corresponding edge may be marked. In this case, a condition of "being greater than B" may be set as a lower boundary value condition for the next iteration operation.

In a next visit operation, the accessing of the window initiating node (operation 310) may include identifying a lower boundary value of a visit operation (operation 410). For the next visit operation, the first process may secure a permission to access the root node 201 by requesting a lock on the root node 201, and access the root node 201. The first process may request a lock on the node D 211 from the root node 201 by using the lower boundary value, thereby securing a permission to access the node D 211, and accessing the node D 211. Since the node D 211 that is a window initiating node does not correspond to an anchor node, a lock of the node D 211 may be released. The processor may request a lock on a node DD 212 that is a next anchor node, thereby securing a permission to access the node DD 212, and accessing the node DD 212. Since the node DD 212 is an anchor node, the DD 212 may maintain the lock and release the lock of the root node 201. When a permission to access a node DDD 213 is secured by requesting a lock on the node DDD 213 while traversing lower nodes of the node DD 212, the lock of the node DD 212 may be released. And, the node DDD 213 that is determined as another anchor node may be accessed and become a window initiating node. When a traversal of lower nodes of the node DDD 213 is completed, nodes from the first window initiating node 211 to a last lower node DDDD 214 of a second iteration operation may correspond to one group 620. Since the traversal of the lower nodes of the current window initiating node 213 is completed, the lock of the window initiating node 213 may be released, and a node DDF 217 that is a next node of the last node DDDD 214 that has been traversed in the traversal order may be set as a lower boundary value for a next iteration operation. As described above, when visiting the window initiating node 213 from the node DD 212 that is an upper anchor node of the window initiating node 213, a corresponding edge may be marked, and a condition of "being greater than DDD" may be set as a lower boundary value condition for the next iteration operation.

In the next iteration operation, when the traversal that begins from the node 217 which is a first window initiating node is completed, a third group 630 may be determined. As a last group of a trie, a fourth group 640 may be determined when up to a last node EEE 221 of the trie is traversed, and thus a trie traversal operation of the first process may be terminated.

FIG. 7 is a diagram illustrating a result of dividing a trie into two groups by a second process in which a threshold for determining an anchor node is set to 3 while traversing all nodes included in the trie according to a method for controlling an access to a trie data structure according to an example embodiment.

Since the threshold for determining an anchor node of the second process is 3, the node B 203 may not be set as an anchor node, unlike the first process. Therefore, a first group 710 determined according to an example embodiment by the second process may include nodes from the node B 203 to the node DDFF 218 that is a last lower node of the anchor node DD 212.

FIGS. 8 to 14 are diagrams illustrating a process in which a method for controlling an access to a trie according to an example embodiment operates, when a process that performs a delete operation and a process that performs a search operation simultaneously access a trie.

More specifically, FIGS. 8 to 14 illustrate an operation process according to an example embodiment of a first process (process1) that deletes a character string ABD from a trie in which character strings are stored and a second process (process2) that searches for the character string ABD in the trie. Here, a threshold value that is a criterion for determining an anchor node by the first process and the second process may be 2, and a node having two or more child nodes may be determined as an anchor node.

Table 1 below shows the entire operation process of FIGS. 8 to 14.

Referring to FIG. 8, a node A 802 that is a window initiating node according to the first process may be in a state of being locked by the first process, and a node AB 803 may be a next visited node according to the first process. A root node 801 that is a window initiating node according to the second process may be in a state of being locked by the second process, and a node A 802 may be a next visited node according to the second process. The first process that is an operation of accessing the node AB 803 may not be in a state of being locked by another process, and thus the first process may secure a permission to access the node AB 803 and move to the node AB 803, thereby determining whether the node AB 803 is an anchor node. The second process that is an operation of accessing the node A 802 may be in a state of being locked by the first process, and thus the second process may not move to the node A 802 until a permission to access the node A 802 is secured.

Referring to FIG. 9, the first process may release a lock of a node A set as an anchor node and set a lock on a node AB, based on a determination that the node AB is an anchor node.

Referring to FIG. 10, since the lock on the node A set by the first process is released, the second process may secure a permission to access the node A. Therefore, the second process may move to the node A, and may set a lock on the node A and release a lock of a root node that is a locked node, based on a determination that the node A is an anchor node.

Referring to FIG. 11, the first process may perform an operation of deleting a node ABD according to a successful search for the character string ABD. Since the node AB is locked by the first process, the second process may not move to the node AB until a permission to access the node AB is secured.

Referring to FIG. 12, the first process may release a lock on the node AB set by the first process, and may terminate the operation.

Referring to FIG. 13, since the lock on the node AB set by the first process is released, the second process may secure a permission to access the node AB. Therefore, the second process may move to the node AB and determine whether the node AB is an anchor node. Since the second process accesses the node AB after the operation of deleting the node ABD is performed by the first process, it may be determined that the node AB having only one child node is not an anchor node.

TABLE 1

| Process1 (ABD deletion - Exclusive lock) | Process2 (ABD search - Shared Lock) |
|---|---|
| Setting a lock on a root node | Requesting a lock and waiting for return on a root node |
| Determining whether a node A is an anchor node (anchor node O) | |
| Setting a lock on a node A, and releasing a lock of a root node | |
| | Setting a lock on a root node |
| Determining whether a node AB is an anchor node (anchor node O) | Requesting a lock and waiting for return on a node A |
| Setting a lock on a node AB, and releasing a lock of node A | |
| | Setting a lock on a node A, and releasing a lock of a root node |
| Deleting a node ABD (Leaf node release and garbage collection) | |
| Releasing a lock of a node AB | |
| | Determining whether a node AB is an anchor node (anchor node X) |
| | Failing to search for a node ABD |

Referring to FIG. 14, since the node AB does not correspond to an anchor node, the lock of the second process on the node A may be maintained, and the node AB may not have an edge with an edge value D, and thus the second process may fail to search for the character string ABD, and the search may be terminated. When the operation of the second process is terminated, the lock on the node A set by the second process may be released, although not illustrated in the drawings.

Figure 15:
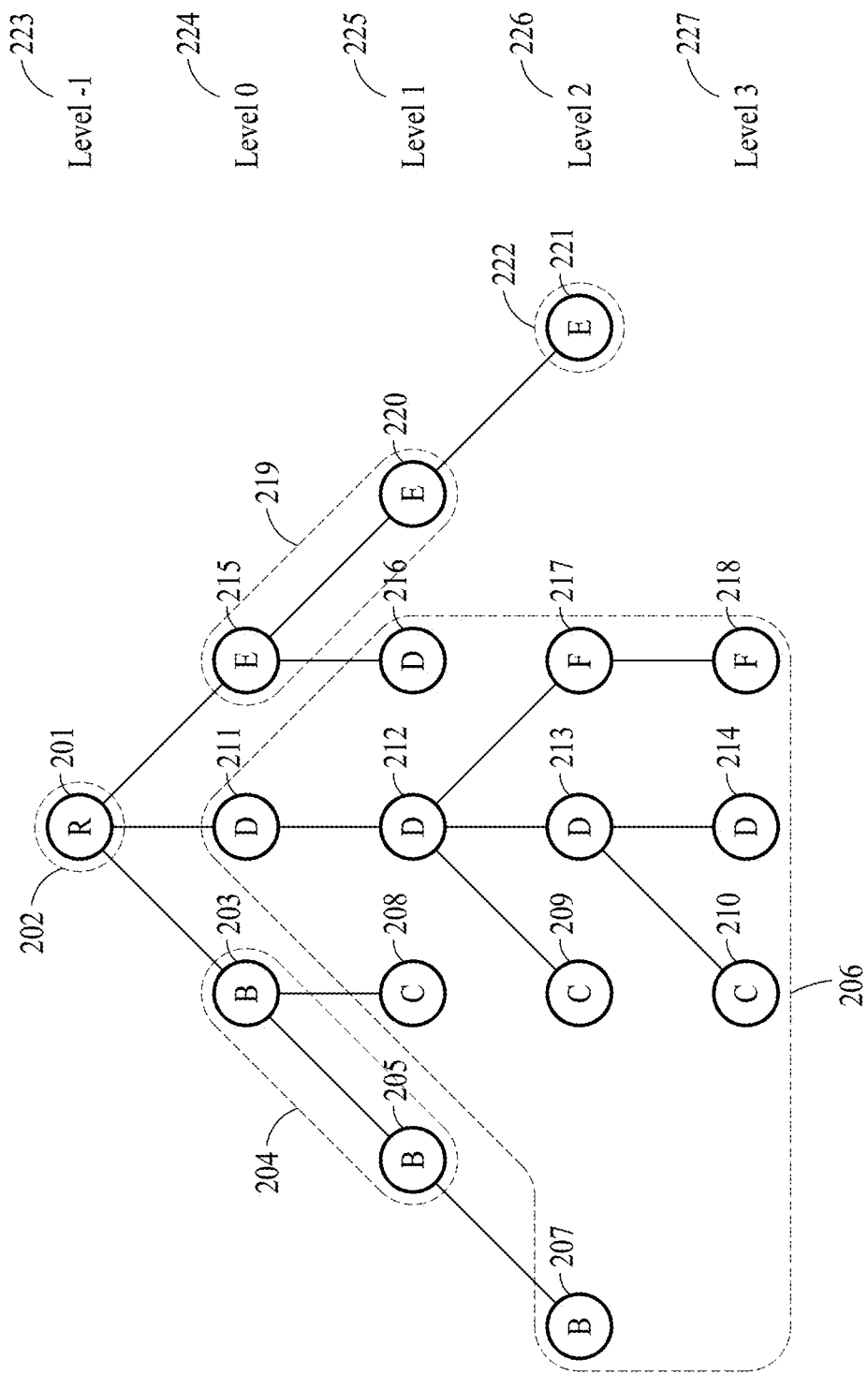
FIG. 15 is a diagram illustrating an area divided depending on a range with an upper boundary and a lower boundary for an operation of a trie according to an example embodiment.

FIG. 15 is a diagram illustrating an area divided depending on a range with an upper boundary and a lower boundary for an operation of a trie according to an example embodiment.

Referring to FIG. 15, a lower boundary area or an L area 204 according to an example embodiment may include nodes corresponding to data provided as a lower boundary value. An upper boundary area according to an example embodiment or a U area 219 may include nodes corresponding to data provided as an upper boundary value. A neutral area according to an example embodiment or an N area 206 may include nodes corresponding to data with a value greater than that of data provided as a lower boundary value and data with a value less than that of data provided as an upper boundary value. An exclusion area according to an example embodiment or an O area 222 may include nodes corresponding to data with a value greater than that of data provided as an upper boundary value, and may include nodes corresponding to data with a value less than that of data provided as a lower boundary value, although not illustrated in the drawings. That is, the exclusion area according to an example embodiment may represent an area excluded from a target to be traversed. A root area according to an example embodiment or an R area 202 may be defined as an area including only the root node 201. With respect to the operation of the trie according to an example embodiment, a lower boundary or an upper boundary may be set, and when the lower boundary or upper boundary is not set, a lower boundary area or an upper boundary area may not exist. Hereinafter, the lower boundary area, the upper boundary area, the neutral area, the exclusion area, and the root area may be indicated as an L area, a U area, an N area, an O area and an R area, respectively.

The operation of the trie according to an example embodiment may include a range traversal operation in which a lower boundary or an upper boundary is set. For example, when a traversal operation of the trie is performed, the traversal operation may be performed within a range determined depending on the lower boundary or upper boundary, and when a search operation of the trie is performed, the search operation may be within the range determined depending on the lower boundary or upper boundary.

When a lower boundary is set with respect to the operation of the trie according to an example embodiment, the method for controlling an access to a data structure may further include receiving data indicating a node where a traversal starts. When an upper boundary is set with respect to the operation of the trie according to an example embodiment, the method may further include receiving data indicating a node where the traversal is terminated.

FIG. 19 is a diagram illustrating example embodiments in which processing is performed differently for each area to which a next visited node belongs, according to an example embodiment. Referring to FIG. 19, a process may request a lock so as to access a root node belonging to an area R. Since no data is stored in a root node, the process may skip a leaf check for checking whether the node is a leaf node in which data is stored. In addition, since the root node is considered as an anchor node in example embodiments, the process may skip an anchor node determination for checking whether the node is an anchor node or a sub-anchor node. When a lower boundary value or upper boundary value is set for an iteration operation, the process may scan lower edges based on a corresponding condition. Nodes of scanned lower edges may correspond to an L area, an N area, a U area, and a C area. In case it is necessary to set a lower value of a next iteration operation, when visiting a node of a lower edge, the process may mark the edge.

The process may check whether an area of a next visited node is an intermediate level of the L area. The intermediate level of the L area may represent a level corresponding to some (for example, AB) of character strings (for example, ABC) constituting a lower boundary value. The process may request a lock so as to access a next visited node of the L area. In the case of the intermediate level, the process may skip a leaf check of the node. The process may perform an anchor node determination of the node. Thus, when the node is an anchor node, the process may maintain a lock of the node and release an upper lock. The process may scan a lower edge based on the lower boundary value, and when visiting the scanned edge, the process may mark the edge. A node of the scanned lower edge may correspond to the L area. As a result of performing the anchor node determination, when the node is not an anchor node, the process may maintain a lock of an upper anchor and release the lock of the node. The process may scan the lower edge based on the lower boundary value. The node of the scanned lower edge may correspond to the L area.

Hereinafter, when performing the anchor node determination, an operation of releasing or maintaining the lock of the node and the upper lock may be performed together depending on a result of the anchor node determination, and for convenience of description, redundant descriptions are not provided.

When the next visited area is not the intermediate level but a final level (for example, ABC), the process may skip the leaf check of the node when a lower boundary condition does not include an equal sign. The process may perform the anchor node determination of the node. The process may scan all lower edges. A node of the scanned lower edge may correspond to the N area. When the node is an anchor node, upon visiting a scanned edge, the edge may be marked. When the node is not an anchor node, a corresponding iteration operation may be completed through scanning of the lower edge. In this case, the process may release an upper lock and set a lower boundary value for a next iteration operation based on edge marking information.

Depending on the example embodiment, a lower edge that satisfies conditions of a lower boundary value and/or an upper boundary value may not exist. In this case, a corresponding iteration operation may be terminated in the process of scanning the lower edge. The process may release an upper lock (or a lock placed on a current node when the current node is an anchor node), and may set a lower boundary value for a next iteration operation based on edge marking information.

The process may request a lock so as to access a node of the N area. The process may perform the leaf check of the node, and may perform the anchor node determination. The process may scan all lower edges. A node of the scanned lower edge may correspond to the N area. When the node is an anchor node, upon visiting a node of a scanned edge, the process may mark the edge.

The process may request a lock so as to access a node of the U area. When the next visited area is an intermediate level of the U area, the process may perform the leaf check of the node, and may perform the anchor node determination. The process may scan a lower edge based on an upper boundary value. A node of the scanned lower edge may correspond to the U area. When the node is an anchor node, the process may mark an edge of a visited node.

When the next visited area is a final level of the U area, the process may skip the leaf check when an upper boundary condition does not include an equal sign. The process may skip the anchor node determination and release a lock of the node. Since a corresponding iteration operation is completed at a node of the final level of the U area, the process may release an upper lock and set a lower boundary value of a next iteration operation based on edge-marking information.

The terms described in FIG. 19 may be understood as indicated in Table 2.

TABLE 2

Store a text in an edge/check whether a leaf node is stored in a node (whether a character string is stored)/an area may be determined based on a lower edge even before accessing a lower node
lock: A lock of an accessing node/upper lock: A lock of an upper anchor node
lower edge scan ( ): Scan in consideration of a lower boundary-lower boundary value/scan in consideration of an upper boundary-upper boundary value/scan in consideration of a lower boundary and an upper boundary together/full-full scan In a lower edge scan ( ), in the case of a subsequent visit, scan after a previous visited edge/when there is no edge that satisfies a scan condition, complete an iteration (upper lock release + next iteration setting)
edge marking: When an iteration is completed, store, in advance, a location for setting a lower boundary value of a next iteration (at the time of lower edge scanning at an anchor node)
next iteration setting: Set a lower boundary value of a next iteration using an edge marking stored at the time completion of an iteration (set a lower boundary value with a node with an edge greater than an edge marking)
(iteration completion): Check whether a visit to up to a largest character string node of a leaf anchor node is completed
node operation: Check whether a corresponding node is a leaf node during a read operation/perform modification, addition or deletion on a corresponding node during a write operation
(last level): Check whether it is a last level of a corresponding area
(lower boundary equal sign): Check whether a condition is greater than or "equal to" a lower boundary value
(upper boundary equal sign): Check whether a condition is less than or "equal to" an upper boundary value
(lower boundary/upper boundary equal sign): Check whether there is an "equal sign" condition for both a lower boundary value and an upper boundary value
(anchor): Check whether it is an anchor node/when it is checked to be an anchor node, check also whether it is a sub-anchor node. When it is an anchor node or a sub-anchor node, pile it on a stack.

FIGS. 16A to 16D are diagrams illustrating an operation process when an upper boundary area and/or a lower boundary area set as a traversal condition of a trie overlap to each other according to an example embodiment.

A C area according to an example embodiment may correspond to an area including nodes included in both an L area including a lower boundary value and a U area including an upper boundary value. Referring to FIGS. 16A to 16D, the C area may correspond to an area including a node D and a node DD included in both the L area and the U area.

Figures 16A, 16B, 16C, 16D:
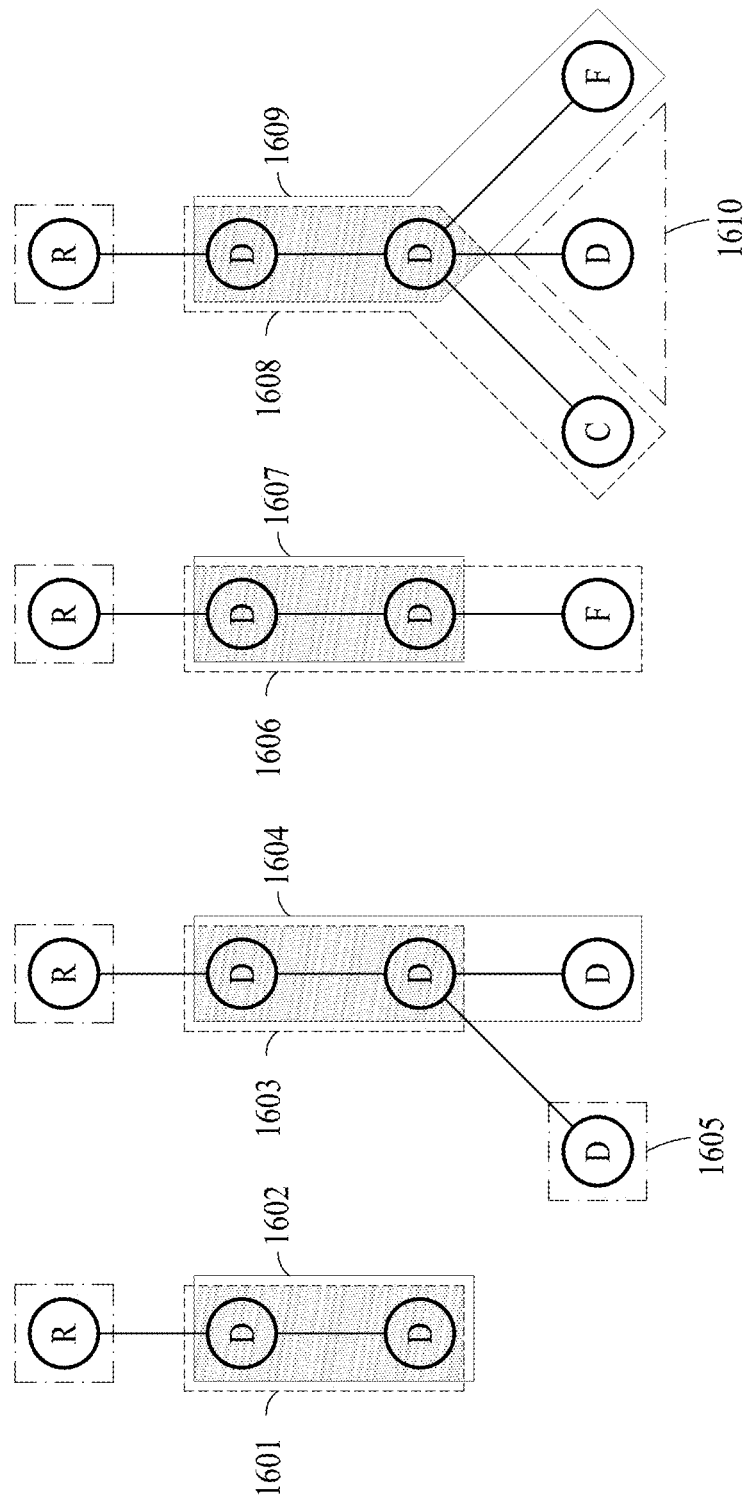
FIGS. 16A to 16D are diagrams illustrating an operation process when an upper boundary area and/or a lower boundary area set as a traversal condition of a trie overlap to each other according to an example embodiment.

More specifically, FIG. 16A illustrates a case where a lower boundary value and an upper boundary value are identical, and thus an L area 1601 indicating a lower boundary value and a U area 1602 indicating an upper boundary value are the same. In this case, the C area may correspond to the same area as the L area 1601 and/or the U area 1602. Hereinafter, the C area illustrated in FIG. 16A may be referred to as a Type-A C area.

FIG. 16B illustrates a case where an upper boundary value has a length longer than that of a lower boundary value, and a part of the upper boundary value is identical to the entire lower boundary value, and thus the L area 1603 indicating the lower boundary value is included in the U area 1604 indicating the upper boundary value. In this case, the C area is the same as an L area 1603, and all nodes corresponding to a value greater than the lower boundary value and less than the upper boundary value may be included in an N area 1605. Hereinafter, the C area illustrated in FIG. 16B may be referred to as a Type-B C area.

FIG. 16C illustrates a case where a lower boundary value has a length longer than that of an upper boundary value, and a part of the lower boundary value is identical to the entire upper boundary value, and thus a U area 1607 indicating the upper boundary value is included in an L area 1606 indicating the lower boundary value. In this case, the C area may be the same as the U area, and the C area may be referred to as a Type-C C area.

FIG. 16D illustrates a case where an upper boundary value is greater than a lower boundary value, and a part of an L area 1608 and a part of a U area 1609 have the same value. In this case, the C area may correspond to an area included in both the L area and the U area, and an area greater than the lower boundary value and less than the upper boundary value may be included in an N area 1610. Hereinafter, the C area illustrated in FIG. 16D may be referred to as a Type-D C area.

Referring to FIG. 19, when a next visited area belongs to the C area, a process may check a type of the C area. When the next visited area corresponds to a C-c type, the process may terminate an iteration operation, release an upper lock, and set a lower boundary value of a next iteration operation.

When the next visited area corresponds to a C-a type, the process may check whether an equal sign condition exists in both an upper boundary value condition and a lower boundary value condition. When the equal sign condition does not exist in either of the upper and lower boundary value conditions, the process may terminate an iteration operation, release an upper lock, and set a lower boundary value of a next iteration operation.

When the equal sign condition exists in both the upper and lower boundary value conditions, the process may check whether the next visited area corresponds to an intermediate level of the C-a type. The process may request a lock so as to access a node of the C-a type. When the next visited area corresponds to the intermediate level, the process may skip a leaf check and perform an anchor node determination. The process may scan a lower edge in consideration of both a lower boundary value and an upper boundary value. A node of the scanned lower edge may correspond to the C area. When the next visited area corresponds to a final level, the process may perform the leaf check and skip the anchor node determination. The process may release a lock of the node, release a lock of an upper anchor, and set a lower boundary value for a next iteration operation.

When the next visited area corresponds to a C-b type, the process may check whether the next visited area corresponds to an intermediate level of the C-b type. The process may request a lock so as to access a node of the C-b type. When the next visited area corresponds to the intermediate level, the process may skip the leaf check and may perform the anchor node determination. The process may scan a lower edge considering of both a lower boundary value and an upper boundary value. The scanned lower edge may correspond to the C area. When the next visited area corresponds to a final level, the process may skip the leaf check when there is no equal sign in a lower boundary condition. The process may perform the anchor node determination, and may scan a lower edge in consideration of the upper boundary value. A node of the scanned lower edge may correspond to the N area or the U area. When the node is an anchor node, upon visiting a node of a lower edge, the process may mark the lower edge.

When the next visited area corresponds to a C-d type, the process may check whether the next visited area corresponds to an intermediate level of the C-d type. The process may request a lock so as to access a node of the C-d type. The process may skip the leaf check and perform the anchor node determination. The process may scan a lower edge in consideration of both a lower boundary value and an upper boundary value. A node of the scanned lower edge may correspond to the C area, the L area, the N area, or the U area. When the node corresponds to a final level and the node is an anchor node, upon visiting a node of a lower edge, the process may mark the lower edge.

Hereinafter, a process of determining an area of a trie according to a specific implementation example of an example embodiment is described.

Assuming that a level of a corresponding branch off anchor node is LEVEL BO, and an edge value connected to a last visited lower node among lower nodes is EDGE BO, it may be assumed that there is a lower node located at a level of LEVEL BO+1 and connected from a branch off anchor node to an edge value of EDGE BO+1, and a character string indicated by the lower node may be defined as a lower boundary value of a subsequent iteration operation. For example, when a character string indicated by a branch off anchor node is "AB" and an edge value connected from the anchor node to a last visited lower node is "C", "ABD" may be set as a lower boundary value for a next iteration operation.

When an arbitrary node belonging to a trie is NODE A, an edge value connected to a child node may be indicated as a character value, an integer value including 0 corresponding thereto, or a number greater than or equal to a binary value. A smallest edge value may be indicated as MIN and a largest value may be indicated as MAX. In this case, when a level of NODE A is assumed to be LEVEL A, a level of a lower node may be indicated as LEVEL A+1.

In this case, the arbitrary node constituting the trie may be mapped to a partial area of a computer main memory unit or auxiliary memory unit. Alternatively, when the trie includes a set of one or more computing devices, one node may be mapped to one computing device, and may be mapped to a part of a main memory unit or auxiliary memory unit belonging to a specific computing device, and may be mapped to an input/output device such as a network interface.

A conditional statement including a lower boundary value or an upper boundary value may define a first character of a character string thereof as a character string index 0, and a character of the character string index 0 may represent an edge value of a node connected from a root node with a value of LEVEL −1 to a node with LEVEL 0. A node with the remaining LEVEL may have the same type of relationship between an edge value and a character string index.

In a method of indicating an edge value connected from a specific node to a child node of the specific node, an edge value belonging to a lower boundary value may be indicated as EDGE L, and an edge value belonging to an upper boundary value may be indicated as EDGE U. An edge value in a range greater than EDGE L+1 and less than EDGE U−1 may be indicated as EDGE N. In this case, assuming that a level of a specific node is LEVEL A, a level of a lower node may be LEVEL A+1.

When a lower boundary value and an upper boundary value are provided, lengths of the L area and the U area may be the same as those of character strings indicating the lower boundary value and the upper boundary value, respectively. Therefore, assuming that the length of the lower boundary value is LOWER LENGTH and the length of the upper boundary value is UPPER LENGTH, a level of a last node among nodes constituting the L area may have a value of LOWER LENGTH-1, and a level of a last node among nodes constituting the U area may have a value of UPPER LENGTH −1.

In an operation process for an anchor node, a sub-anchor node, and a normal node, a process of sequentially traversing from the anchor node or sub-anchor node to a lower node may be divided into two types of visits such as a first visit and a subsequent visit. The visits may have different lower node traversal methods and area setting processes.

Figure 17C:
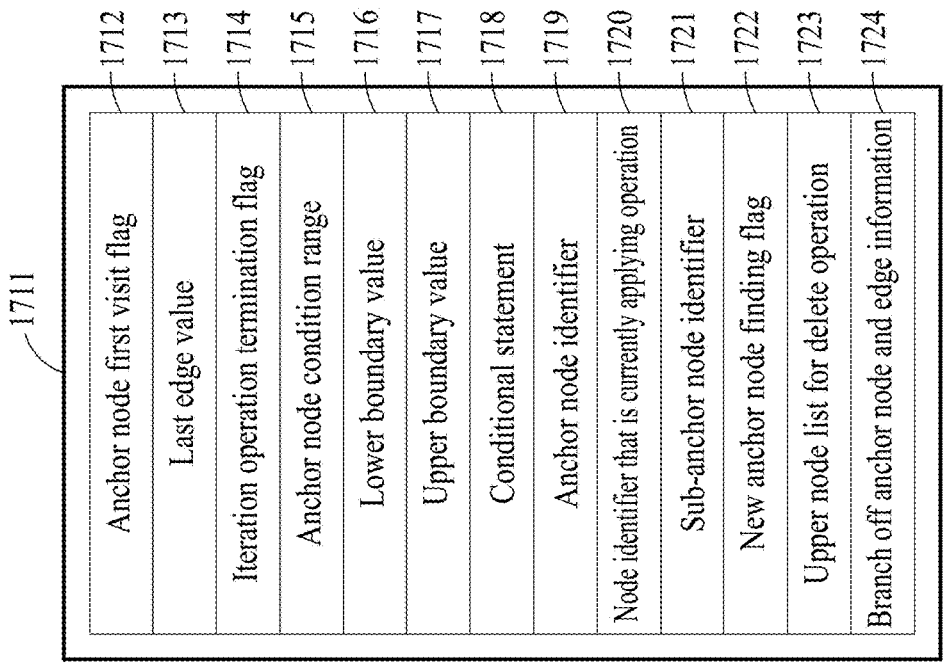
FIG. 17C is a diagram illustrating a data structure of an operation group according to an example embodiment.

An edge value processed during the first visit and the subsequent visit to the anchor node may be stored in a last edge value 1713 illustrated in FIG. 17C. Upon a next visit, a process of determining a traversal range of a lower node may be performed with reference to a value of corresponding data, and the value may be updated and stored as an edge value on which an operation has been most recently performed.

An edge value processed during the first visit and the subsequent visit to the sub-anchor node may be stored in a last edge value 1729 included in each element of a sub-anchor node identifier 1727 illustrated in FIG. 17E. The element of the sub-anchor node identifier 1727 may correspond to a data structure including a node identifier 1728 and the last edge value 1729.

When sorting traversal results in ascending order, the first visit may be a process of traversing a lower node with a smallest edge value, and the subsequent visit may be a process of traversing all lower nodes with an edge value greater than an edge value of a node corresponding to the first visit.

When an anchor node belongs to the R area and only a lower boundary value is provided as a traversal condition for a trie, in a lower node traversal and area determination process based on a first visit to the anchor node, a traversal range of a lower node may be a range from EDGE L to MAX. When an edge value of the lower node is EDGE L, an area of the lower node may be determined as the L area, and when the edge value of the lower node is greater than EDGE L and is less than or equal to MAX, the area may be determined as the N area.

When an anchor node belongs to the R area and only a lower boundary value is provided as a traversal condition for a trie, in a lower node traversal and area determination process based on a subsequent visit to the anchor node, a traversal range of a lower node may be defined as a range from an edge value greater than a value stored in the last edge value 1713 to MAX, and areas of all lower nodes within the range may be set as the N area.

When an anchor node belongs to the R area and only an upper boundary value is provided as a traversal condition for a trie, in a lower node traversal and area determination process based on a first visit to the anchor node, a traversal range of a lower node may be a range from MIN to EDGE U. When an edge value of the lower node is equal to or greater than MIN and is less than or equal to EDGE U−1, an area of the lower node may be set as the N area, and when the edge value is equal to EDGE U, the area of the lower node may be set as the U area.

When an anchor node belongs to the R area and only an upper boundary value is provided as a traversal condition for trie, in a lower node traversal and area determination process based on a subsequent visit to the anchor node, a traversal range and an area of a lower node may be set in the same manner as the above-described lower node traversal and area determination process based on the first visit.

Next, when an anchor node belongs to the R area, and both lower and upper boundary values are provided as a traversal condition for a trie, and the lower and upper boundary values are different from each other, in a lower node traversal and area determination process based on a first visit to the anchor node, a traversal range of a lower node may be a range from EDGE L to EDGE U. When an edge value of the lower node is equal to EDGE L, an area of the lower node may be set as the L area. When the edge value is equal to EDGE U, the area may be set as the U area. When the edge value is equal to or greater than EDGE L+1, and is less than or equal to EDGE U−1, the area may be set as the N area.

When an anchor node belongs to the R area and both lower and upper boundary values are provided as a traversal condition for a trie, and the lower and upper boundary values are different from each other, in a lower node traversal and area determination process based on a subsequent visit to the anchor node, a traversal range of a lower node may be a range from EDGE L+1 or a value obtained by adding 1 to the last edge value 1713 to EDGE U. When an edge value of the lower node is equal to EDGE U, an area of the lower node may be set as the U area. When the edge value is equal to or greater than EDGE L+1, and is less than or equal to EDGE U−1 or is equal to or greater than the value obtained by adding 1 to the last edge value 1713, and is less than or equal to EDGE U−1, the area may be set as the N area.

When an anchor node belongs to the R area, and both lower and upper boundary values are provided as a traversal condition for a trie, and characters constituting the upper and lower boundary values are partially or all the same, in a lower node traversal and area determination process based on a first visit to the anchor node, in the case of a Type-A, Type-B, or Type-D C area, a traversal range of a lower node may be EDGE L or EDGE U with the same value as that of EDGE L, and an area of the lower node may be set as the C area. In the case of a Type-C C area, an operation may be terminated.

When an anchor node belongs to the R area and lower and upper boundary values are not provided, a traversal range of a lower node may be defined as a range from MIN to MAX, and areas of all lower nodes may be defined as the N area.

When an anchor node belongs to the L area and only a lower boundary value is provided as a traversal condition for a trie, in a lower node traversal and area determination process based on a first visit to the anchor node, a level of the anchor node is less than a last level of the L area, a traversal range of a lower node may be a range from EDGE L to MAX. When an edge value of the lower value is equal to EDGE L, an area of the lower node may be set as the L area. When the edge value of is equal to or greater than EDGE L+1, and is less than or equal to MAX, the area may be set as the N area. When the level of the anchor node is the same as the last level of the L area, the traversal range of the lower node may be set as a range from MIN to MAX, and the area may be set as the N area regardless of the edge value of the lower node.

When an anchor node belongs to the L area, and only a lower boundary value is provided as a traversal condition for a trie, in a lower node traversal and area determination process based on a subsequent visit to the anchor node, a level of the anchor node is less than a last level of the L area, a traversal range of a lower node may be defined as a range from an edge value equal to or greater than a value obtained by adding 1 to an edge value stored in the last edge value 1713 to MAX, and areas of all lower node found may be set to the N area. When the level of the anchor node is the same as the last level of the L area, the traversal range of the lower node may be set as a range from the edge value equal to or greater than the value obtained by adding 1 to the edge value stored in the last edge value 1713 to MAX, and an area of the lower node may be set as the N area regardless of the edge value of the lower node.

When an anchor node belongs to the L area and both lower and upper boundary values are provided as a traversal condition for a trie, and the lower and upper boundary values are different from each other, in a lower node traversal and area determination process based on a first visit to the anchor node, when a level of the anchor node is less than a last level of the L area, a traversal range of the lower node may be a range from EDGE L to MAX. When an edge value of the lower node is equal to EDGE L, an area of the lower node may be set as the L area. When the edge value is equal to or greater than EDGE L+1, and is less than and equal to MAX, the area may be set as the N area. When the level of the anchor node is the same as the last level of the L area, the traversal range of the lower node may be set as a range from MIN to MAX, and the area may be set as the N area regardless of the edge value of the lower node.

When an anchor node belongs to the L area, and both lower and upper boundary values are provided as a traversal condition for a trie, the lower and upper boundary values are different from each other, in a lower node traversal and area determination process based on a subsequent visit to the anchor node, when a level of the anchor node is less than a last level of the L area, a traversal range of a lower node may be set as a range from a value obtained by adding 1 to a value of data of the last edge value 1713 to MAX, and areas of all lower nodes within the range may be set as the N area. When the level of the anchor node is the same as the last level of the L area, the traversal range of the lower node may be set as a range from an edge value equal to or greater than a value obtained by adding 1 to an edge value stored in the last edge value 1713 to MAX, and an area of the lower node may be set as the N area regardless of the edge value of the lower node.

When an anchor node belongs to the N area, a traversal range of all lower nodes may be a range from MIN to MAX regardless of whether there are lower and upper boundary values provided as a traversal condition for a trie, and whether the values are identical, and areas of all the lower nodes may be determined as the N area at all times. In the case of a subsequent visit, a traversal range of a lower node may be set as a range from a value obtained by adding 1 to the last edge value 1713 to MAX.

When an anchor node belongs to the U area and only an upper boundary value is provided as a traversal condition for a trie, in a lower node traversal and area determination process based on a first visit to the anchor node, when a level of the anchor node is less than a last level of the U area, a traversal range of a lower node may be a range from MIN to EDGE U. When an edge value of the lower node is from MIN to EDGE U−1, an area of the lower node may be set as the N area. When the edge value is equal to EDGE U, the area may be set as the U area. When the level of the anchor node is the same as the last level of the U area, an operation may be terminated.

When an anchor node belongs to the U area and only an upper boundary value is provided as a traversal condition for a trie, in a lower node traversal and area determination process based on a subsequent visit to the anchor node, when a level of the anchor node is less than a last level of the U area, a traversal range of a lower node may be defined as a range from an edge value equal to or greater than a value obtained by adding 1 to an edge value stored in the last edge value 1713 to MAX. When the edge value is a value between MIN and EDGE U−1, an area of the lower node may be set as the N area, and when the edge value is equal to EDGE U, the area may be set as the U area.

When an anchor node belongs to the U area and both lower and upper boundary values are provided as a traversal condition for a trie, and the lower and upper boundary values are different from each other, in a lower node traversal and area determination process based on a first visit to the anchor node, when a level of the anchor node is less than a last level of the U area, a traversal range of a lower node may be a range from MIN to EDGE U. When an edge value of the lower node is a value between MIN and EDGE U−1, an area of the lower node may be set as the N area. When the edge value is equal to EDGE U, the area may be set as the U area. When the level of the anchor node is the same as the last level of the U area, an operation on the lower node may be terminated.

When an anchor node belongs to the U area and both lower and upper boundary values are provided as a traversal condition for a trie, and the lower and upper boundary values are different from each other, in a lower node traversal and area determination process based on a subsequent visit to the anchor node, when a level of the anchor node is less than a last level of the U area, a traversal range of a lower node may be a range from a value obtained by adding 1 to a value of data of the last edge value 1713 to EDGE U. When an edge value of the lower node is equal to or greater than the value obtained by adding 1 to the value of the data of the last edge value 1713, and is less than or equal to EDGE U−1, an area of the lower node may be set as the N area. When the edge value is equal to EDGE U, the area may be set as the U area. When the level of the anchor node is the same as the last level of the U area, an operation on the lower node may be terminated.

When an anchor node belongs to the C area and a level of the anchor node is less than a last level of the C area, only an operation based on a first visit may be performed without a subsequent visit when a type of the C area is a Type-A, Type-B, or Type-D. A traversal range of a lower node may be EDGE L or EDGE U with the same value as that of EDGE L, and an area of the lower node may be set as the C area at all times.

When an anchor node belongs to the C area, a level of the anchor node is the same as a last level of the C area, and a type of the C area is a Type-B, in a lower node traversal and area determination process based on a first visit to the anchor node, a traversal range of a lower node may be a range from MIN to EDGE U. When an edge value of the lower node is a value between MIN and EDGE U−1, an area of the lower value may be set as the N area, and when the edge value is equal to EDGE U, the area may be set as the U area.

When an anchor node belongs to the C area, a level of the anchor node is the same as a last level of the C area, and a type of the C area is a Type-B, in a lower node traversal and area determination process based on a subsequent visit to the anchor node, a traversal range of a lower node may be a range from a value obtained by adding 1 to the last edge value 1713 to EDGE U. When an edge value of the lower node is less than or equal to EDGE U−1, an area of the lower node may be set as the N area, and when the edge value is equal to EDGE U, the area may be set as the U area.

When an anchor node belongs to a C area, a level of the anchor node is the same as a last level of the C area, and a type of the C area is a Type-D, in a lower node traversal and area determination process based on a first visit to the anchor node, a traversal range of a lower node may be a range from EDGE L to EDGE U. When an edge value of the lower node is equal to EDGE L, an area of the lower node may be set as an L area, and when the edge value is a value between EDGE L+1 and EDGE U−1, the area may be set as an N area.

When an anchor node belongs to the C area, a level of the anchor node is the same as a last level of the C area, and a type of the C area is a Type-D, in a lower node traversal and area determination process based on a subsequent visit to the anchor node, a traversal range of a lower node may be a range from a value obtained by adding 1 to a value of the last edge value 1713 to EDGE U. When an edge value of the lower node is equal to EDGE U, an area of the lower node may be set as the U area, and when the edge value is an edge value between the value obtained by adding 1 to the value of the last edge value 1713 and a value less than or equal to EDGE U−1, the area may be set as the N area.

Figure 17A:
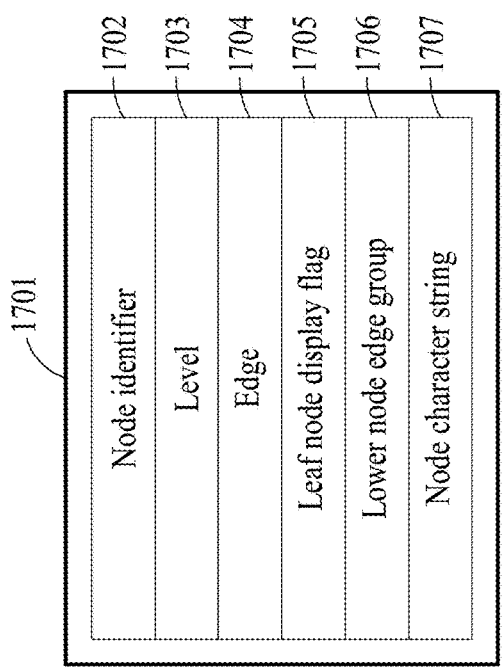
FIG. 17A is a diagram illustrating a structure of a node constituting a trie data structure according to an example embodiment.

FIG. 17A is a diagram illustrating a structure of a node constituting a trie data structure according to an example embodiment.

Referring to FIG. 17A, a node 1701 may represent one node constituting a trie, and may include data representing a node identifier 1702, a level 1703, an edge 1704, a leaf node display flag 1705, a lower node edge group 1706, a node character string 1707, and the like.

The node identifier 1702 may represent a unique identifier for distinguishing a corresponding node from all nodes constituting a trie. The level 1703 may represent level information to which the corresponding node belongs. The edge 1704 may represent information on an edge value connected from a parent node to the corresponding node.

The leaf node display flag 1705 may represent information on whether the corresponding node is a leaf node.

Figure 17B:
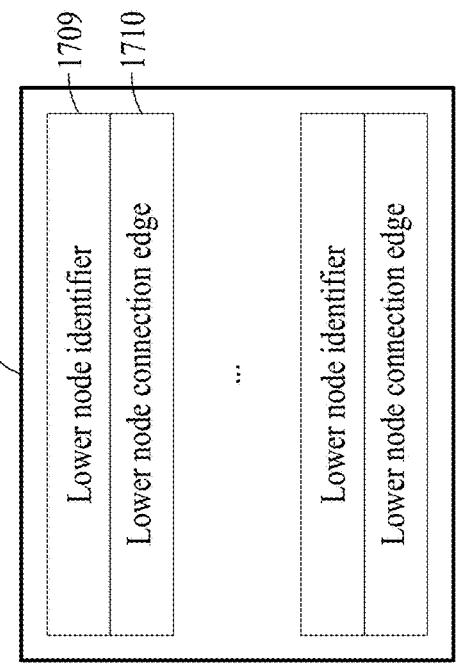
FIG. 17B is a diagram illustrating a data structure of a lower node edge group according to an example embodiment.

The lower node edge group 1706 may represent information on a child node of the corresponding node, and may use a data structure illustrated in FIG. 17B. Referring to FIG. 17B, one piece of child node information 1708 may include data such as a lower node identifier 1709 and a lower node connection edge 1710. The lower node identifier 1709 may be a unique identifier for distinguishing the child node from another child node of the corresponding node, and the lower node connection edge 1710 may represent an edge value connected to the child node.

The node character string 1707 may represent a character string corresponding to the corresponding node. According to an example embodiment, when data stored in the trie is a type of data other than a character string, the node character string 1707 may represent the type of data.

Referring to FIG. 17C, an operation group 1711 may be a data structure used for a process that performs read, write, and delete operations by accessing the trie. TRUE stored in an anchor node first visit flag 1712 may represent that a visit to an anchor node stored in an anchor node identifier 1719 is a first visit, and FALSE stored in the anchor node first visit flag 1712 may represent that the visit to the anchor node is a subsequent visit.

The last edge value 1713 may store an edge value of a lower node processed through a lower node traversal and area determination process of a current visited anchor node, and may use a value obtained by subtracting 1 from a current stored value at a next visit as a starting point of a traversal range of the lower node. When an iteration operation termination flag 1714 is set to TRUE, the operation may be terminated. An anchor node condition range 1715 may store a threshold of the number of lower nodes that is a condition for setting an arbitrary node as an anchor node, and a lower boundary value 1716 and an upper boundary value 1717 may respectively store lower boundary value data and upper boundary value data. A conditional statement 1718 may be data representing an operation range using an upper boundary value and a lower boundary value. The anchor node identifier 1719 may store an identifier of an anchor node or a window initiating node on which an operation is currently being performed, and a node identifier 1720 that is currently performing an operation may store a next visited node and an area of the next visited node. A sub-anchor node identifier 1721 may be a stack data structure of storing identifier information when a sub-anchor node is found during a trie traversal. A detailed structure of the sub-anchor node identifier 1721 is illustrated in FIG. 17E. Referring to FIG. 17E, a sub-anchor node identifier 1727 may include element(s) including a node identifier 1728 representing an identifier of a sub-anchor node, and an edge value 1729 of a most recently moved lower node among edge values connected to a lower node of the sub-anchor node. When moving to a child node with a next edge value after returning to the sub-anchor node during a trie traversal process, a movement to a lower node with the next edge value may performed with reference to the edge value 1729 of the most recently moved lower node of the sub-anchor node. In this case, an edge value of the lower node with the next edge value may be stored in the last edge value 1729.

When an anchor node is found while performing a delete operation, an upper node list for a delete operation 1723 may sequentially store an identifier of the anchor node and an identifier of a subsequent visited lower node, and then may delete a last visited lower node for the delete operation. Thereafter, when deleting information of the deleted lower node from edge value information of an upper node, the upper node list for a delete operation 1723 may be used to refer to an identifier of the upper node. When a new anchor node is found, all previous information may be deleted from the upper node list for a delete operation 1723, and identifiers from an identifier of the new anchor node to an identifier of a lower node may be sequentially stored in the same manner.

Branch off anchor node and edge information 1724 may be a data structure used to set a lower boundary value for an operation on lower nodes of a next window initiating node after an operation on lower nodes of a current window initiating node is terminated. The branch off anchor node and edge information 1724 may store information on edge values of a branch off anchor node and a last visited lower node among lower nodes of the branch off anchor node, and may be used to update the values upon first and subsequent visits to the anchor node.

Referring to FIG. 17D, data of a traversal result list 1725 may be a data structure used to store a search result or a result of a read operation. When a specific node is selected according to a result of performing an operation, a value of a node character string 1702 of FIG. 17A may be stored in the traversal result list 1725 when data corresponding to the node is included in a traversal result. In this case, as described above, when an operation is performed in ascending order, and then results of performing the operation are added from front to back in order, the results may be sorted in ascending order. In order to sort the results in descending order, an order of adding the results may be performed in a manner of inserting a current search result before a first character string 1726.

FIG. 18 is a diagram illustrating a configuration of an operation processor for executing a method for controlling an access to a trie data structure according to an example embodiment.

A trie operation processor 1801 according to an example embodiment may include an anchor node condition range processor 1802, an area-specific processor 1803, and a node visit operation processor 1804.

The anchor node condition range processor 1802 may manage information on a range of the number of lower nodes that is a condition for setting an arbitrary node as an anchor node, and may be used in the determining of whether the next visited node is an anchor node (operation 340).

The area-specific processor 1803 may correspond to a configuration of processing, by each area, processes of searching for a lower node by an area to which an anchor node, a sub-anchor node, or a normal node belongs, determining an area of the lower node, and determining whether the next visited node is an anchor node.

The node visit operation processor 1804 may perform a movement to a corresponding lower node, setting of an anchor node, and managing of an access permission according to an operation result of the area-specific processor 1803, and may correspond to a configuration of referring to data of the operation group 1711 of FIG. 17C, or setting the data.

A trie data structure management unit 1805 may create and store a trie data structure, and may perform an operation of granting or retrieving an access permission in response to a processing request of the trie operation processor 1801, and one trie data structure management unit 1805 may process the operation with respect to processes of a plurality of trie operation processors 1801.

The trie operation processor 1801 and the trie data structure management unit 1805 may reside in a main memory unit or auxiliary memory unit driven by different CPUs, and may be implemented in an on-chip form, and thus may be realized in an external auxiliary memory unit.

The example embodiments described above, which relate to a method and apparatus for controlling an access to a data structure, have been described as being applied to a trie data structure, but are also applicable to tries with different names and other data structures converted based on a trie (for example, patricia trie, radix tree, binary trie, aho corasick, and the like).

FIG. 20 is a diagram illustrating example embodiments in which processing is performed differently for each area to which a next visited node belongs when processes use different anchor node conditions according to an example embodiment.

Referring to FIG. 20, when processes use different anchor node conditions, each process may visit normal nodes other than anchor nodes in a crabbing manner. Comparing the example embodiments of FIG. 20 to the example embodiments of FIG. 19, when moving (accessing) from an intermediate node to a lower node, the example embodiments may have a difference of securing a lock and then releasing a lock of an upper node, or releasing a lock of an upper node and securing a lock of a lower node, and then moving (accessing).

The terms described in FIG. 20 may be understood as indicated in Table 3.

When there is another process requesting a lock on the anchor node and waiting, the garbage collection performed on the anchor node may be problematic. In order to prevent this problem, according to an example embodiment, for the garbage collection, the process may leave the last edge of the corresponding anchor node and process the edge in a next iteration operation. For example, by setting a lower boundary value of the next iteration operation as the last edge of the anchor node, the process may process the edge in the next iteration operation.

More specifically, the delete operation on the trie may be defined by dividing into two major operations such as a delete operation on an L, N, U, C-b type, and C-d type, and a delete operation on a C-a type.

1. Delete Operation on C-a Type

First, for a deletion operation on a C-a type, the process may search for and find a node of a last level of the C area in the same manner as a read operation, and may check whether the node is a leaf node. When the node is a leaf node, the process may cancel a leaf node setting.

In this case, when the node of the last level where the leaf node setting is cancelled does not have another lower node anymore, there is no reason for the node to exist (because the node is a garbage), and thus the process may delete the node

TABLE 3

Figure 21:
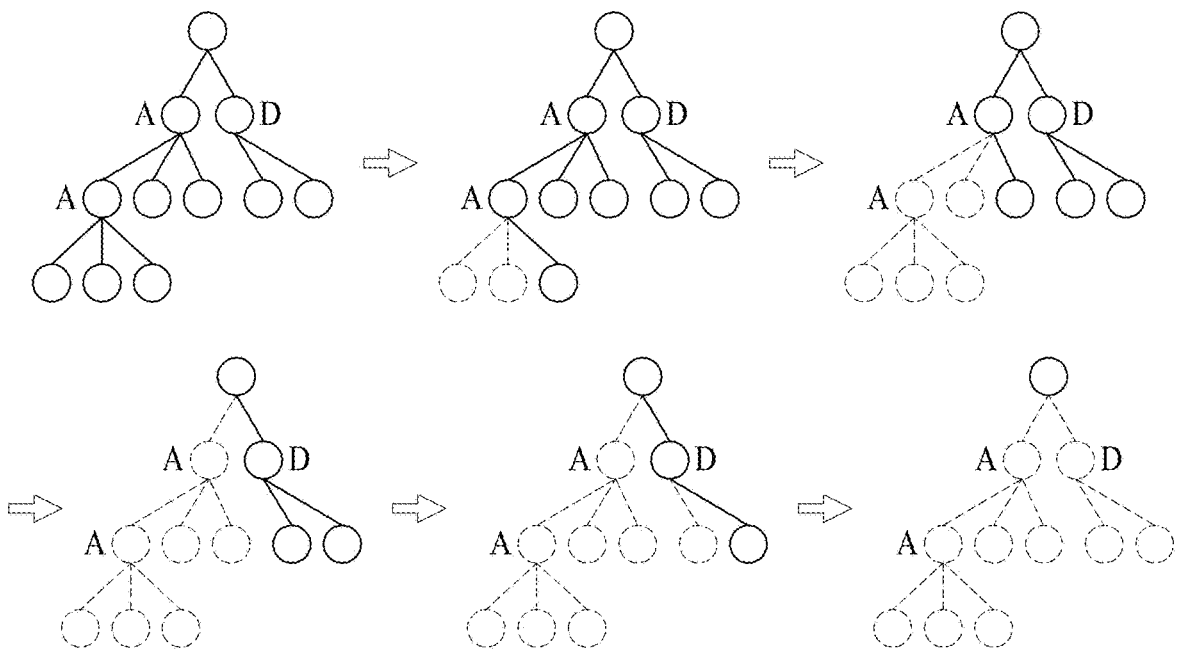
FIGS. 21 to 23 are diagrams illustrating a delete operation according to an example embodiment.
Figure 22:
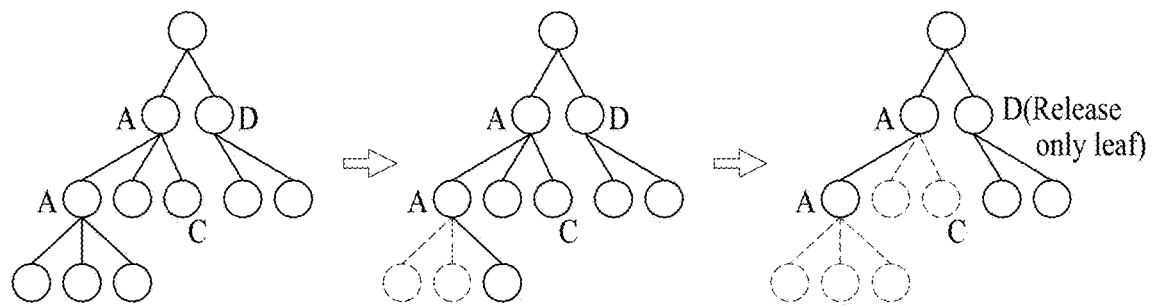
Figure 23:
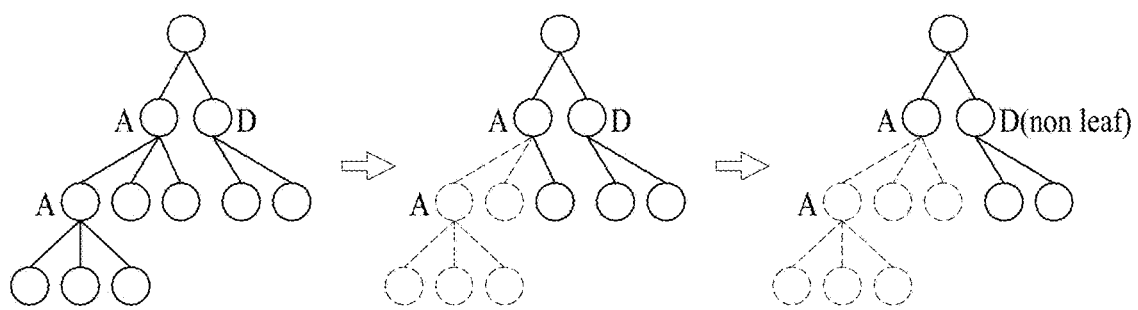

Store a text in an edge/check whether a leaf node is stored in a node (whether a character string is stored)/an area may be determined by checking a lower edge even before accessing a lower node
lock: A lock of an accessing node (next node)/p_lock: A lock of a parent node of an accessing node (a current node before accessing a next node)/upper lock: A lock of an upper anchor node
lower edge scan ( ): Scan in consideration of a lower boundary-lower boundary value/scan in consideration of an upper boundary-upper boundary value/scan in consideration of a lower boundary and an upper boundary together/full-full scan
In a lower edge scan ( ), in the case of a subsequent visit, scan after a previous visited edge/when there is no edge that satisfies a scan condition, complete an iteration (upper lock release + next iteration setting)
edge marking: When an iteration is completed, store, in advance, a location for setting a lower boundary value of a next iteration (at the time of lower edge scanning at an anchor node)
next iteration setting: Set a lower boundary value of a next iteration using an edge marking stored at the time completion of an iteration (set a lower boundary value with a node with an edge greater than an edge marking)
(iteration completion): Check whether a visit to up to a largest string node of a leaf anchor node is completed
node operation: Check whether a corresponding node is a leaf node during a read operation/perform modification, addition or deletion in a corresponding node during a write operation
(last level): Check whether it is a last level of a corresponding area
(lower boundary equal sign): Check whether a condition is greater than or "equal to" a lower boundary value
(upper boundary equal sign): Check whether a condition is less than or "equal to" an upper boundary value
(lower boundary/upper boundary equal sign): Check whether there is an "equal sign" condition for both a lower boundary value and an upper boundary value
(anchor): Check whether it is an anchor node/when it is checked to be an anchor node, check also whether it is a sub-anchor node. When it is an anchor node or a sub-anchor node, pile it on a stack.
(p_anchor): Check whether a parent node of an accessing node (a current node before accessing a next node) is an anchor node FIGS. 21 to 23 are diagrams illustrating a delete operation according to an example embodiment. For the delete operation, when a node to be deleted exists in a trie and the node is a leaf node, a process may perform a garbage collection after releasing the leaf node.

When a last edge of an anchor node is deleted, if the anchor node is not a leaf node, the anchor node may also be a target on which a garbage collection is to be performed.

of the last level. In addition, the process may reset an edge value connected to the last level from an upper node with an edge value connected to the node of the last level, that is, a node of an immediately preceding level obtained by subtracting 1 from the last level.

In addition, the process may reset an edge value connected from a node of a last level-1 to the last level. Thereafter, when no more other nodes are connected to the node of the last level-1, the process may also delete the node and clean (reset) an edge value connected from an upper node of the node.

The process may repeatedly perform the above-described process up to an anchor node (including a root node and a sub-anchor node). Here, the reason for performing only up to the anchor node or sub-anchor node is that the anchor node or sub-anchor node has at least two lower nodes. Thus, even when one lower node is deleted, another lower node may exist, so there is no reason to delete any more.

In other words, a method for deleting the C-a type may include two processes such as a process of searching for and finding a specific node in the same manner as a read operation, and a garbage collection process of determining whether the node is a leaf node, deleting an unnecessary node by cancelling (resetting) a leaf node setting, and deleting an edge value connected from an upper node (after a specific node is found by the read operation, the leaf node setting may be cancelled, and then the garbage collection may be performed if necessary).

Here, the above-described embodiments may be applied, such as determining an anchor node and performing an operation on the anchor node in a process of finding a node of a last level. In this process, a method for dividing a trie into one or more groups may be applied to solve a bottleneck.

2. Delete Operation on L, N, U, C-b Type, and C-d Type

For a process of deleting a range in the N area, that is, deleting a large number of nodes, when a lower boundary value and an upper boundary value are not provided, all nodes under a root node being deleted at once may have the same meaning as that of all nodes under the root node being read at once in a read operation, and thus fail to meet the purpose of the example embodiments to process an operation by dividing one trie into several groups.

Therefore, according to an example embodiment, in order to divide a group in a range delete operation, the same method as the read operation may be used, and may be defined as adding a garbage collection process to the existing read operation after finding a node that has no more lower nodes (after determining whether the node is a leaf node), as follows.

The process may cancel a leaf node setting of a node that has no more lower nodes, delete the node, and release an edge value of an upper node that has the node, and may repeatedly perform the same process on up to a sub-anchor node or an anchor node. This process may correspond to a manner of finding a node through a read operation, and then going up to a higher level while performing a garbage collection. In conclusion, it can be understood as a manner of going up toward a root while deleting nodes per anchor node backwards, that is, a process of deleting nodes one by one starting from nodes existing on the left of lower nodes of a leaf anchor node existing at the bottom of a trie.

For example, when character strings aaa, aaaa, aab, and aac are stored in a trie, assuming that a node aa is an anchor node, a node visited first when performing a read operation is a node aaa, and then the process may visit a node aaaa. Since the node aaaa does not have a lower node, the process may start a garbage collection from this time point. The process may delete the node aaaa and release an edge a from the aaa, and may return to an anchor node aa while deleting the node aaa as well since the node aaa has no more lower nodes. Thereafter, the read operation may be performed again on a node aab. Since there is no low node under the node aab, the garbage collection may be performed again from this time point. That is, the process may delete the node aab and return back to the node aa.

Here, there is no problem in securing a lock on an anchor node and performing a search or read operation on a lower node of the anchor node. However, when a garbage collection is performed on a lower node of a leaf anchor node where no anchor node is found anymore, a lock may be secured on the leaf anchor node, however, other subsequent processes may be also waiting in a state of requesting a lock on the leaf anchor node. In this case, the fact that a first process has performed a garbage collection on all lower nodes may represent that the leaf anchor node needs to be deleted since the leaf node also belongs to garbage that has no more lower nodes. In this case, when the leaf anchor node is deleted, there is a problem in that target anchor nodes of the subsequent processes that have requested and waited for the lock on the node disappear, and the subsequent processes needs to perform abnormal termination.

For example, when the process reads up to a node aac and starts a garbage collection, the process may delete the node aac and return to the anchor node aa, and thus there may be no more lower nodes. Since the leaf node has been already released upon a first visit, the node aa may not need to exist. Here, when the node aa is also deleted, the above-described problem may occur.

Therefore, when applying the "method for dividing one trie into several groups" proposed by the example embodiments to a delete operation (in particular, a range delete operation), the process may perform a characteristic operation of "performing a delete operation for a lower node of an anchor node, when an operation target (target to be read down) node is a last remaining node of the anchor node, on up to a previous node of the node (only up to a immediately preceding edge excluding a last edge value of the anchor node), and visiting and deleting the others through a next iteration operation".

As a result, a read operation or another delete/write operation waiting at the anchor node may recognize the anchor node as a node that has only one lower node at the moment that a lock on the anchor node is secured, and may perform a necessary operation.

In addition, when the first process performs a second subsequent iteration operation (delete iteration operation), a condition of a previous iteration operation (or a condition of an initial entire operation) may be applied without modification, unlike a read operation that a newly sets a start node (initiating node) while providing the start node as a lower boundary value. However, depending on the example embodiment, the process may set a lower boundary value for a second delete iteration operation as a character string represented by a last anchor node of a first delete iteration operation, in a similar manner with the read operation.

Hereinafter, an example embodiment in which a lower boundary value of an existing delete iteration operation is maintained is described. In this case, it may be required to have a premise that there is no write operation of another process until a delete operation of a specific process is terminated. This is because there may be a conflict between the delete operation of the process and the write operation of another process.

For example, FIG. 21 is a diagram illustrating a process in which an iteration operation for deletion is sequentially applied. Referring to FIG. 21, for a second iteration operation, a start node of the iteration operation may not be designated as a lower boundary value in the same manner as a read operation. When the start node is designated in the same manner as the read operation, a node that cannot be processed may occurs. In other words, the read operation should not re-read a node that has been read once, however, the delete operation may not re-read and delete the node because a node that has already been deleted does not exist.

That is, the delete iteration operation may be defined as "continuing a delete iteration operation by applying conditions for a lower boundary value and an upper boundary value when a first iteration operation starts without modification".

When a lower boundary value and an upper boundary value are provided as AA and D in the condition of FIG. 21, a delete operation may be performed in the same order as in FIG. 22.

The reason why a garbage collection is performed on up to a node AC at one time in FIG. 22 is that a node AA remains under a node A that is an anchor node, and the node AC is not a last node connected to a last edge. In FIG. 22, when a node D is a leaf node, a leaf node setting may be cancelled, and when the node D is not a leaf node, it may be a result of simply leaving the node D as it is without performing any operation. This is because a deletion range includes up to the node D, and there may be no need for a garbage collection because other nodes are connected under the node D.

When the node AA is not a leaf node, the process may perform the garbage collection, and a result thereof may be illustrated in FIG. 23. Similarly, the node A may be deleted when the node A is not a leaf node. This is because the node A is not a leaf node although the node A is in the L area, (FIG. 23 is a diagram under assumption that only the node AA is not a leaf node.)

In conclusion, even in the case of the L area, the U area, and the like, the process may access a node that has no more lower nodes by performing a read operation in the same order and manner as an existing read operation. Thereafter, the process may perform a garbage collection process of checking a leaf node setting in a "node operation", deleting a node when there is no lower node, and deleting an edge value of an upper node of the node. However, when nodes in the L area and the U area are anchor nodes, the process may continuously perform a delete operation in a next iteration operation without performing a garbage collection on a last edge value remaining in the same manner as in the N area.

In addition, although not illustrated in the drawings, for a write operation, when there is a target node, the process may set the target node as a leaf node, and when there is no target node, the process may create a node and connect the node to an edge value, and then may set the node as a leaf node.

More specifically, the write operation may include an operation on a C-a type and a range write operation.

1. Write Operation on C-a Type

In an existing read operation, the process may create a new lower node and connect an edge value to the node when there is no lower node as a result of scanning a lower node. However, after moving to a node of a last level, the process may set the node as a leaf node and terminate an operation.

2. Write Operation on N, L, U, C-b Type, and C-d Type

It is meaningless (impossible) to perform a range write operation in a state in which a length of a character string is not provided, because an operation of inputting a character string with an infinite length is required.

However, when the length of the character string is designated as a specific N value, the process may repeat the following operation only as much as the length of the character string in the same manner as the above-described C-a Type.

More specifically, with respect to the L, U, N, C-b type, and C-d type, a node may exist at the time of determining whether the node is a leaf node in an L, U, N, C-b type, and C-d type of a read operation, however, when the node is not a leaf node, the process may set the node as a leaf node. When the node does not exist, the process may create a node, connect the node to a scanned edge value, move to the node, and set the node as a leaf node.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for controlling an access to a trie data structure through an iteration operation that processes at least one window, the method comprising
   accessing, by at least one process driven by a processor, a window initiating node in a trie; and
   determining, by the process, whether a next node is an anchor node, while visiting lower nodes of the window initiating node in a predetermined traversal order,
   wherein, when the next node is an anchor node, the method comprises locking, by the process, the next node;
      releasing, by the process, a lock of the window initiating node, when the window initiating node is an anchor node; and
      setting, by the process, the next node as the window initiating node,
   wherein, when a traversal of the lower nodes of the window initiating node is completed, the method comprises
      releasing, by the process, the lock of the window initiating node, when the window initiating node is an anchor node; and
      setting, by the process, a lower boundary value for a next iteration operation so as to indicate a next node of a last node among the lower nodes in the trie, based on the traversal order, and
   wherein the determining of whether the next node is the anchor node comprises
      comparing, by the process, a threshold value to a count of child nodes of the next node; and
      determining, by the process, whether the next node is the anchor node when the count of the child nodes is greater to or equal to the threshold value.

2. The method of claim 1, wherein
   the accessing of the window initiating node comprises
      searching for, by the process, the window initiating node starting from a root node in the trie, based on a lower boundary value of a range traversed by the iteration operation, and
      when the anchor node is found while searching for the window initiating node, the anchor node is locked and an upper lock is released.

3. The method of claim 1, wherein the accessing of the window initiating node comprises locking, by the process, the window initiating node, when the window initiating node is a root node.

4. The method of claim 1, wherein the locking of the next node comprises
   requesting, by the process, the lock on the next node;
   waiting, by the process, until the lock is acquired, after requesting the lock; and
   acquiring, by the process, the lock, in response to the request.

5. The method of claim 1 further comprising
   receiving data to be updated in the trie;
   accessing, by the process, a node corresponding to the data to be updated in the trie by searching the trie using an exclusive lock; and
   updating, by the process, the node,
   wherein, when an anchor node is found while searching for the node corresponding to the data to be updated, the exclusive lock is placed on the anchor node and an upper exclusive lock is released.

6. A non-transitory computer-readable medium storing computer-readable instruction that, when executed by a processor, cause the processor to perform the method of claim 1.

7. The method of claim 1, wherein
   the trie data structure comprises a first level, a second level that is lower than the first level, and a third level that is lower than the second level.

8. The method of claim 7, wherein
   the window initiating node is a root node at the first level,
   the lower nodes of the window initiating node are at the second level and each define a branch from the window initiating node, and
   at least one of the lower nodes having at least one child node at the third level.

9. The method of claim 7, wherein the setting, by the process, the next node as the window initiating node comprises
   in response to a lower node not being an anchor node, the lower node at the second level,
      setting, by the process, the next node as the window initiating node, wherein the next node is an anchor node at the third level.

10. A method for controlling an access to a trie data structure through an iteration operation, the method comprising
    determining, by at least one process driven by a processor, an area type to which a next node belongs among a plurality of area types predetermined for the iteration operation;
    requesting, by the process, a lock on the next node;
    accessing, by the process, the next node, in response to acquiring the lock;
    performing, by the process, a leaf check of the next node depending on the area type; and
    performing, by the process, a lower edge scan of the next node, based on a scan range depending on the area type,
    wherein, when the next node is an anchor node, an upper lock is released while the lock is maintained, and when the next node is not an anchor node, the lock is released while the upper lock is maintained
    wherein, when the next node is an anchor node, the performing of the lower edge scan of the next node comprises marking, by the process, a lower edge being visited, so as to set a lower boundary value of a next iteration operation, and
    wherein, the anchor node is determined by:
       comparing a threshold value to a count of child nodes of the next node; and
       determining whether the next node is the anchor node when the count of the child nodes is greater to or equal to the threshold value.

11. The method of claim 10, wherein the area type comprises at least one of:
    an R type corresponding to a root node;
    an L type corresponding to a node indicating a lower boundary value;
    a U type corresponding to a node indicating an upper boundary value;

an O type corresponding to a node exceeding the upper boundary value;

a C type corresponding to a common node of the lower boundary value and the upper boundary value; and an N type corresponding to a node between the lower boundary value and the upper boundary value.

12. The method of claim 11, wherein the performing of the leaf check comprises skipping, by the process, a check of whether the next node is a leaf node that stores data, when the area type corresponds to one of the R type, an intermediate level of the L type, a final level of the L type when performing an iteration operation without an equal sign in a lower boundary value condition, a final level of the U type when performing the iteration operation without the equal sign in an upper boundary value condition, and an intermediate level of the C type.

13. The method of claim 10, wherein, the performing of the lower edge scan of the next node comprises visiting, by the process, a node connected to a lower edge within the scan range;

visiting, by the process, a node of a next lower edge within the scan range, when a visit to the node connected to the lower edge is completed and returned; and releasing the upper lock and setting a lower boundary value for a next iteration operation based on edge marking information, when there is no scannable lower edge within the scan range.

14. The method of claim 10, wherein
when the iteration operation corresponds to a write operation,
the scan range depending on the area type indicates at least one node for the write operation, and
the performing of the lower edge scan comprises
visiting, by the process, when there is a lower edge corresponding to the scan range, a node of the lower edge to set the node as a leaf node; and
creating, by the process, when there is no lower edge corresponding to the scan range, a node of the lower edge to set the node as a leaf node.

15. The method of claim 10, wherein
when the iteration operation corresponds to a delete operation,
the scan range depending on the area type indicates at least one node for the delete operation, and
the performing of the lower edge scan comprises
visiting, by the process, when there is a lower edge corresponding to the scan range, a node of the lower edge to release a leaf node of the node;
performing, by the process, a garbage collection of the node; and
setting, by the process, a lower boundary value of a next iteration operation based on one of a lower boundary value of the iteration operation or a last lower edge without visiting a node of the last lower edge, when the next node is an anchor node.

* * * * *